United States Patent
Nishi

(10) Patent No.: US 9,432,641 B2
(45) Date of Patent: Aug. 30, 2016

(54) IMAGE PROCESSING DEVICE AND PROGRAM

(75) Inventor: Takeshi Nishi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 88 days.

(21) Appl. No.: 14/342,404

(22) PCT Filed: Sep. 3, 2012

(86) PCT No.: PCT/JP2012/072370
§ 371 (c)(1),
(2), (4) Date: Mar. 3, 2014

(87) PCT Pub. No.: WO2013/032008
PCT Pub. Date: Mar. 7, 2013

(65) Prior Publication Data
US 2014/0204246 A1    Jul. 24, 2014

(30) Foreign Application Priority Data
Sep. 2, 2011  (JP) .................. 2011-191268

(51) Int. Cl.
*H04N 5/235* (2006.01)
*H04N 9/04* (2006.01)
(Continued)

(52) U.S. Cl.
CPC .............. *H04N 9/04* (2013.01); *G06T 5/008* (2013.01); *G06T 5/50* (2013.01); *H04N 5/2355* (2013.01);
(Continued)

(58) Field of Classification Search
CPC .......... H04N 9/04; H04N 9/646; H04N 9/77; H04N 5/2355; G06T 5/008; G06T 5/50; G06T 2207/20208; G06T 2207/10144; G06T 2207/20221

USPC .......... 348/208.12, 221.1, 227.1, 229.1, 362, 348/FOR. 198, FOR. 206
See application file for complete search history.

(56) References Cited

U.S. PATENT DOCUMENTS 5,960,098 A * 9/1999 Tao .................... B07C 5/3422
 348/89
6,546,153 B1 * 4/2003 Hoydal ................ G06T 7/408
 382/276

(Continued)

FOREIGN PATENT DOCUMENTS

| JP | A-2003-46848 | 2/2003 |
| JP | A-2004-48445 | 2/2004 |

(Continued)

OTHER PUBLICATIONS

International Search Report issued in International Patent Application No. PCT/JP2012/072370 dated Nov. 27, 2012.

*Primary Examiner* — Hung Lam
(74) *Attorney, Agent, or Firm* — Oliff PLC

(57) ABSTRACT

An image processing device includes: an identifying unit that identifies an image area where gradations are lost in a first captured image obtained by capturing a subject image; an image texture image generation unit that generates an image texture image by aligning a second captured image, obtained by capturing an image of a subject matching the subject of the first captured image, with the first captured image and extracting an image texture corresponding to the image area having been identified by the identifying unit; and an interpolation unit that executes interpolation for the image area in the first captured image by synthetically incorporating the image texture image having been generated by the image texture image generation unit with the first captured image.

10 Claims, 22 Drawing Sheets

(51) Int. Cl.
  *G06T 5/00* (2006.01)
  *G06T 5/50* (2006.01)
  *H04N 9/64* (2006.01)
  *H04N 9/77* (2006.01)
(52) U.S. Cl.
  CPC ............... *H04N 9/646* (2013.01); *H04N 9/77* (2013.01); *G06T 2207/10144* (2013.01); *G06T 2207/20208* (2013.01); *G06T 2207/20221* (2013.01)

(56) References Cited

U.S. PATENT DOCUMENTS

| | | | |
|---|---|---|---|
| 7,151,606 B2* | 12/2006 | Taniguchi | G01N 21/359 250/330 |
| 8,008,641 B2* | 8/2011 | Harris | G01J 3/46 250/208.1 |
| 9,046,498 B2* | 6/2015 | Hong | G01N 21/9501 |
| 2005/0012848 A1 | 1/2005 | Hayaishi | |
| 2010/0309332 A1 | 12/2010 | Ueda et al. | |
| 2014/0055662 A1* | 2/2014 | Torabi | H04N 5/23212 348/345 |

FOREIGN PATENT DOCUMENTS

| | | |
|---|---|---|
| JP | A-2005-33514 | 2/2005 |
| JP | A-2011-15380 | 1/2011 |

\* cited by examiner

FIG.4
(a)
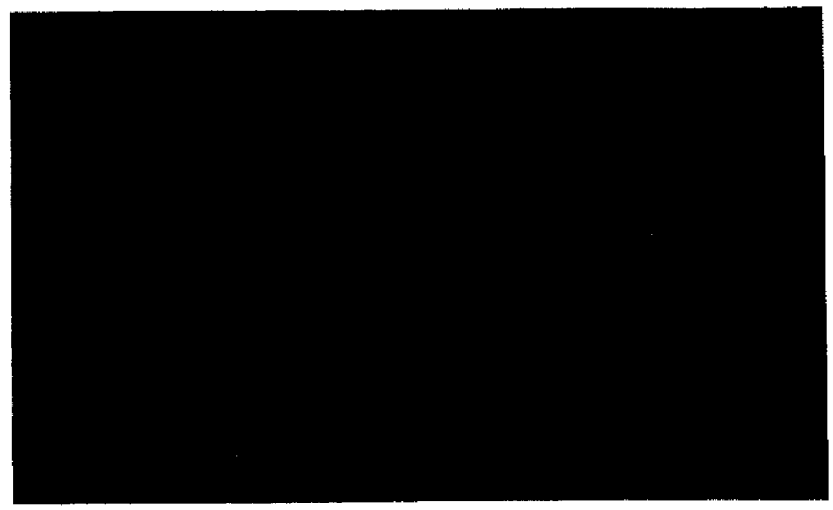
(b)
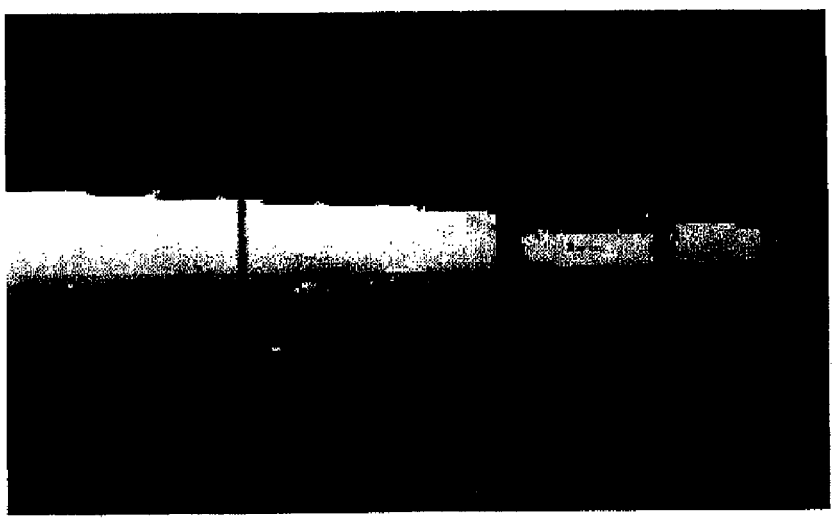

FIG.9
(a)
(b)

FIG.11
(a)
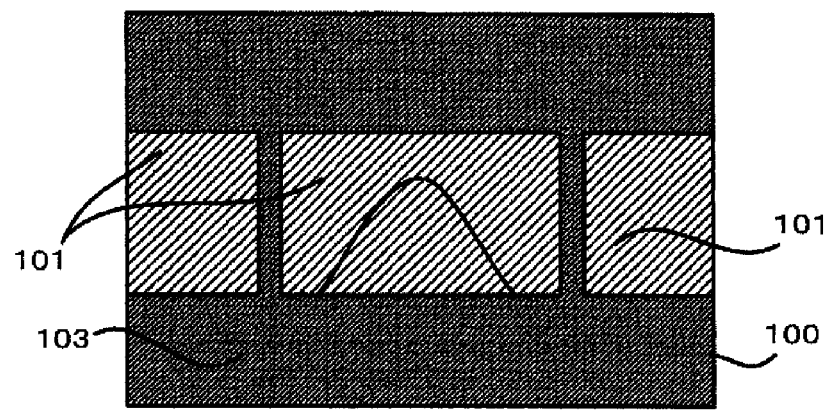
(b)
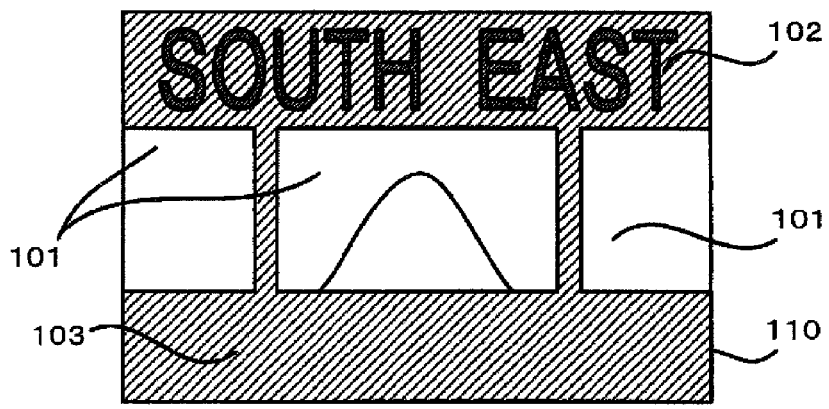
(c)
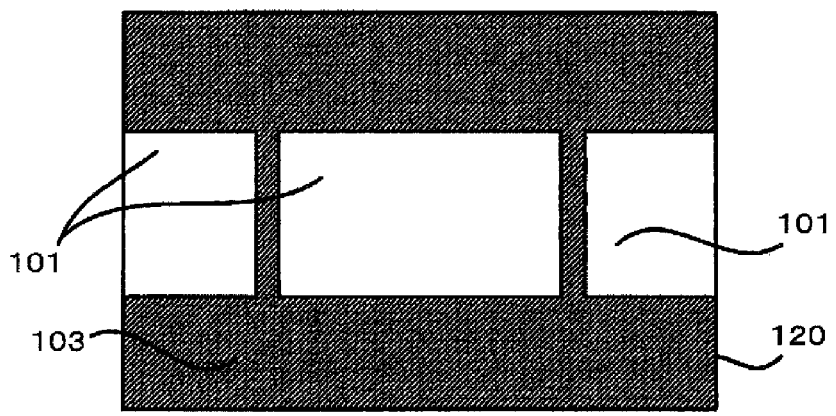

FIG.14
(a)
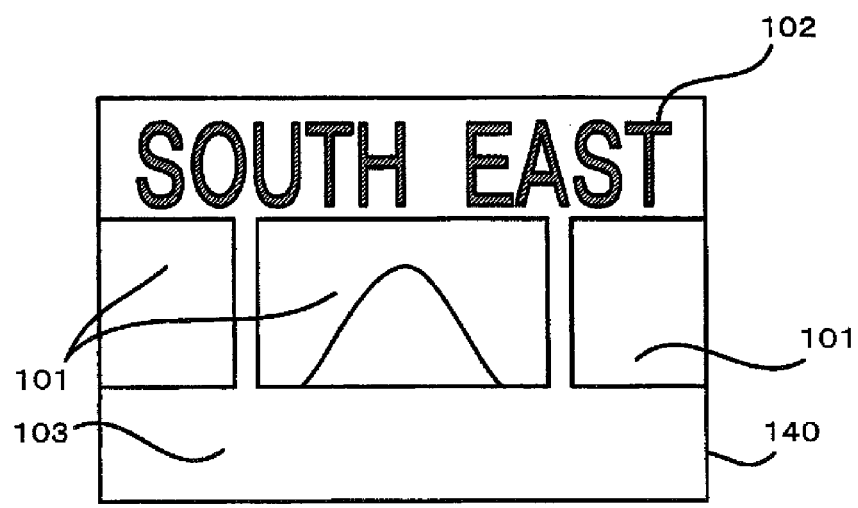
(b)
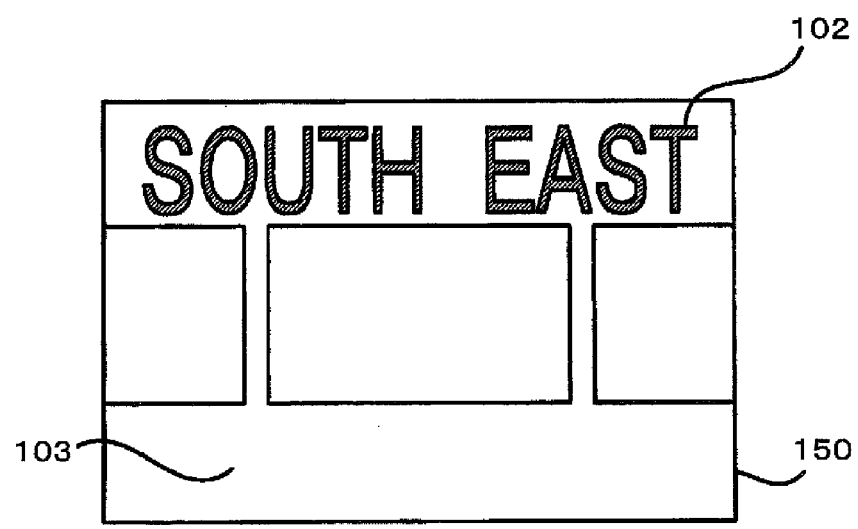

FIG.17
(a)
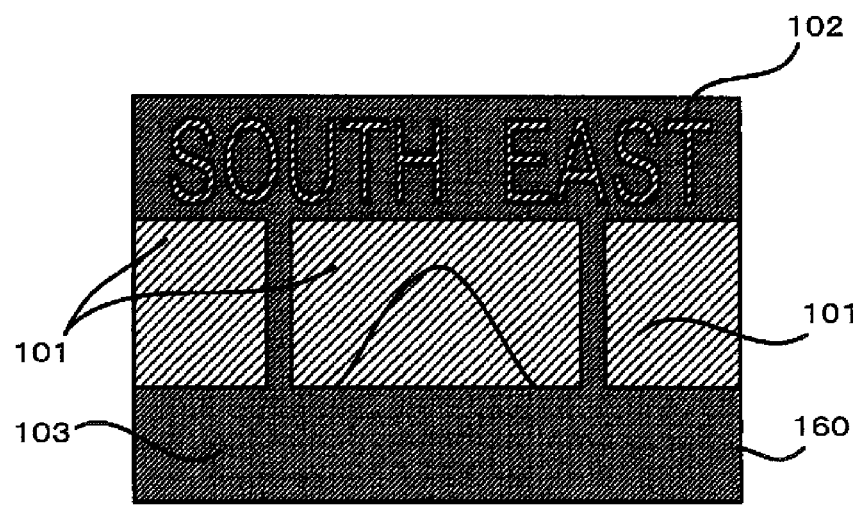
(b)
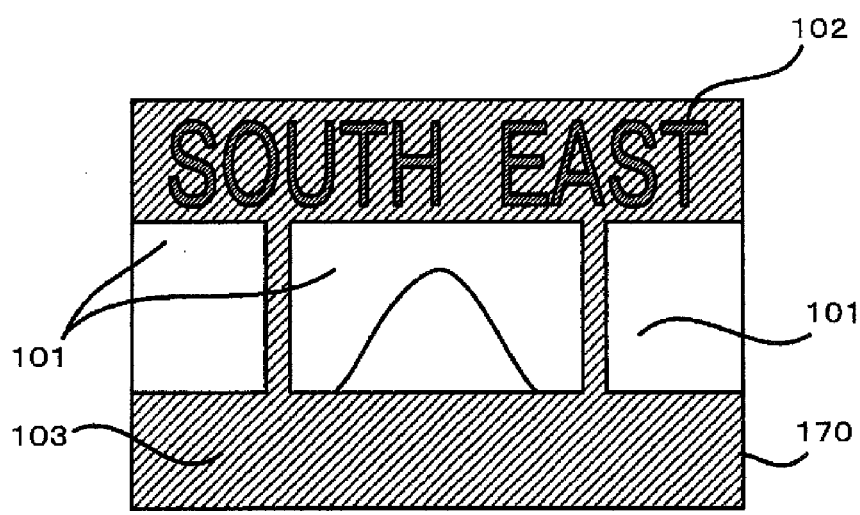

FIG.21
(a)
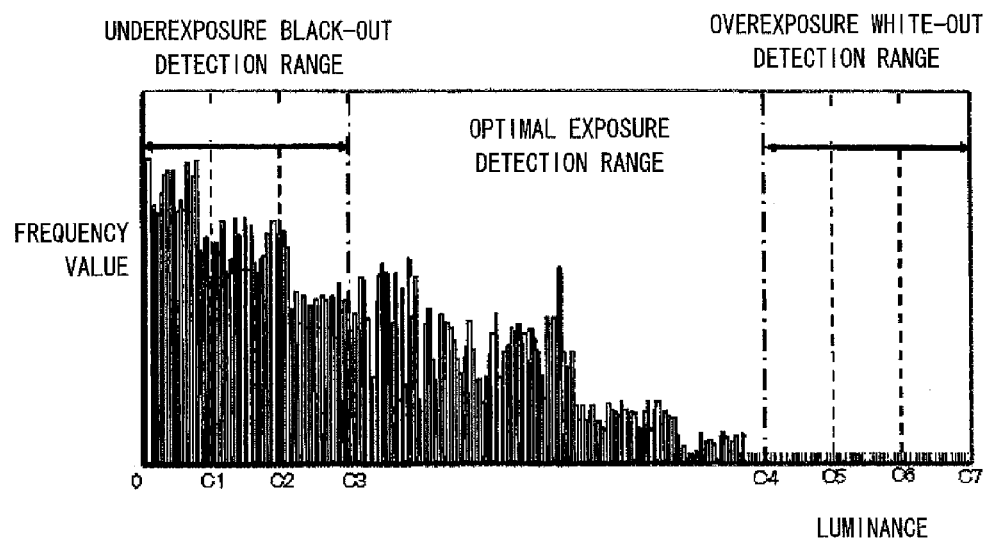
(b)
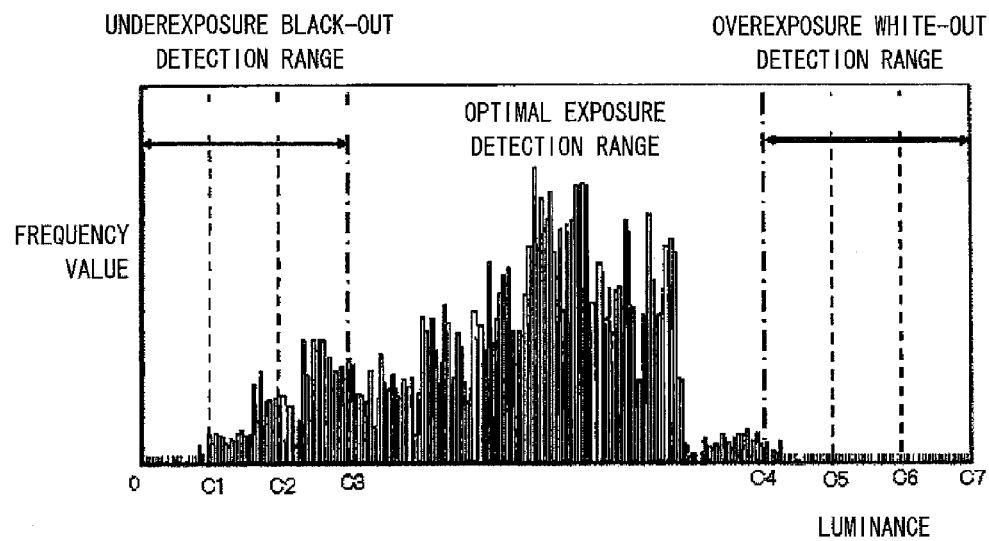

IMAGE PROCESSING DEVICE AND PROGRAM

TECHNICAL FIELD

The present invention relates to an image processing device and a program.

BACKGROUND ART

An image processing device in the related art creates an image free of overexposed (white-out) areas and underexposed (black-out) areas through HDR (high dynamic range) imaging (see patent literature 1). This image processing device successively captures images of a single photographic scene, i.e., an image with the exposure thereof controlled so as to optimize bright areas of the subject and an image with the exposure thereof controlled so as to optimize dark areas of the subject, and creates an image free of any overexposure white-out or underexposure black-out through composite processing that combines these two images.

CITATION LIST

Patent Literature

Patent literature 1: Japanese laid open patent publication No. 2011-15380

SUMMARY OF INVENTION

Technical Problem

However, the composite image created through HDR imaging may have an "unnatural look".

Solution to Problem

According to the 1st aspect of the present invention, an image processing device, comprises: an identifying unit that identifies an image area where gradations are lost in a first captured image obtained by capturing a subject image; an image texture image generation unit that generates an image texture image by aligning a second captured image, obtained by capturing an image of a subject matching the subject of the first captured image, with the first captured image and extracting an image texture corresponding to the image area having been identified by the identifying unit; and an interpolation unit that executes interpolation for the image area in the first captured image by synthetically incorporating the image texture image having been generated by the image texture image generation unit with the first captured image.

According to the 2nd aspect of the present invention, in the image processing device according to the 1st aspect, it is preferred that the image area where gradations are lost includes an image area where at least one of underexposure black-out, overexposure white-out and color saturation has occurred.

According to the 3rd aspect of the present invention, in the image processing device according to the 2nd aspect, it is preferred that the image area where underexposure black-out has occurred is a pixel cluster made up with at least a predetermined number of contiguous pixels indicating luminance values equal to or less than a first threshold value; the image area where overexposure white-out has occurred is a pixel cluster made up with at least a predetermined number of contiguous pixels indicating luminance values equal to or greater than a second threshold value; and the image area where color saturation has occurred is a pixel cluster made up with at least a predetermined number of contiguous pixels indicating chromaticity values equal to or greater than a third threshold value.

According to the 4th aspect of the present invention, in the image processing device according to the 3rd aspect, it is preferred that the image processing device further comprises: a threshold value setting unit that alters either a value setting for the first threshold value or a value setting for the second threshold value or both the value setting for the first threshold value and the value setting for the second threshold value. The threshold value setting unit; generates a luminance histogram of the first captured image and divides the luminance histogram into a plurality of groups; calculates a first difference between an integrated value calculated for a current frame in correspondence to a first group, which includes a lowest grade assuming a frequency value other than 0, among the plurality of groups and an integrated value calculated for a previous frame in correspondence to the group; calculates a second difference between an integrated value calculated for the current frame in correspondence to a second group, which includes a highest grade assuming a frequency value other than 0, among the plurality of groups and an integrated value calculated for the previous frame in correspondence to the group; sets a largest value in the first group for the first threshold value if the first difference is equal to or greater than a predetermined value; and sets a smallest value in the second group for the second threshold value if the second difference is equal to or greater than a predetermined value.

According to the 5th aspect of the present invention, in the image processing device according to any one of the 1st through the 4th aspects, it is preferred that the image texture includes at least image edges.

According to the 6th aspect of the present invention, in the image processing device according to the 5th aspect, it is preferred that the image texture further includes image luminance gradation information.

According to the 7th aspect of the present invention, in the image processing device according to any one of the 1st through the 6th aspects, it is preferred that the image processing device further comprises an image capturing unit that captures the first captured image and the second captured image.

According to the 8th aspect of the present invention, a program enabling a computer to fulfill: an identifying function whereby an image area where gradations are lost is identified in a first captured image obtained by capturing a subject image; an image texture image generation function whereby an image texture image is generated by aligning a second captured image obtained by capturing an image of a subject matching the subject of the first captured image with the first captured image and extracting an image texture corresponding to the image area having been identified by the identifying unit; and an interpolation function whereby interpolation is executed for the image area in the first captured image by synthetically incorporating the image texture image having been generated through the image texture image generation unit and the first captured image.

According to the 9th aspect of the present invention, an image processing device comprises: an image frame extracting unit that extracts a target image frame requiring exposure correction, among image frames constituting a video image recorded in a recording unit; an identifying unit that identifies an image area where gradations are lost in the target image frame; an estimating unit that estimates a texture of the image area where gradations are lost by using an image frame, other than the target image frame, constituting the video image; and an interpolation unit that executes interpolation for the image area where gradations are lost in the image frame based upon estimation results provided by the estimating unit.

According to the 10th aspect of the present invention, in the image processing device according to the 9th aspect, it is preferred that the identifying unit identifies the image area where gradations are lost based upon luminance distribution within the image frame.

According to the 11th aspect of the present invention, in the image processing device according to the 9th or the 10th aspect, it is preferred that the estimating unit generates a texture image for the image area where gradations are lost by using an image frame other than the target image frame; and the interpolation unit executes interpolation by incorporating the texture image in the underexposed area.

According to the 12th aspect of the present invention, in the image processing device according to any one of the 9th through the 11th aspects, it is preferred that the image processing device further comprises an image sensor that captures an image formed with subject light. A video image generated based upon image capturing signals provided from the image sensor is recorded in the recording unit.

Advantageous Effects of Invention

According to the present invention, an image area where any gradation change is substantially absent due to, for instance, underexposure black-out, overexposure white-out, color saturation or the like, is corrected through optimal interpolation.

BRIEF DESCRIPTION OF DRAWINGS

FIG. 4(a) shows an image frame generated at the time point t=4 in FIG. 3 and FIG. 4(b) shows an image resulting from tone curve-based exposure correction executed for the image frame shown in FIG. 4(a).

FIG. 9(a) shows an image frame having the underexposure black-out area thereof interpolated by combining the texture image and FIG. 9(b) shows an image resulting from tone curve-based exposure correction executed for the image frame shown in FIG. 9(a).

FIG. 11(a) shows an image in which gradations are lost due to underexposure black-out as an example of an image in which gradations are absent, FIG. 11(b) presents an example of an image retaining gradations and FIG. 11(c) shows image areas that may be identified by the identifying unit.

FIG. 14(a) shows the image texture of the image shown in FIG. 11(b) and FIG. 14(b) presents an example of an image texture image.

FIG. 17(a) presents an example of an image that may be obtained by incorporating the image texture image through semitransparent blending and FIG. 17(b) presents an example of an image that may result from tone curve-based exposure correction executed for the image shown in FIG. 17(a).

FIG. 21 shows how the luminance histogram may be divided.

DESCRIPTION OF EMBODIMENTS

First Embodiment

Figure 1:
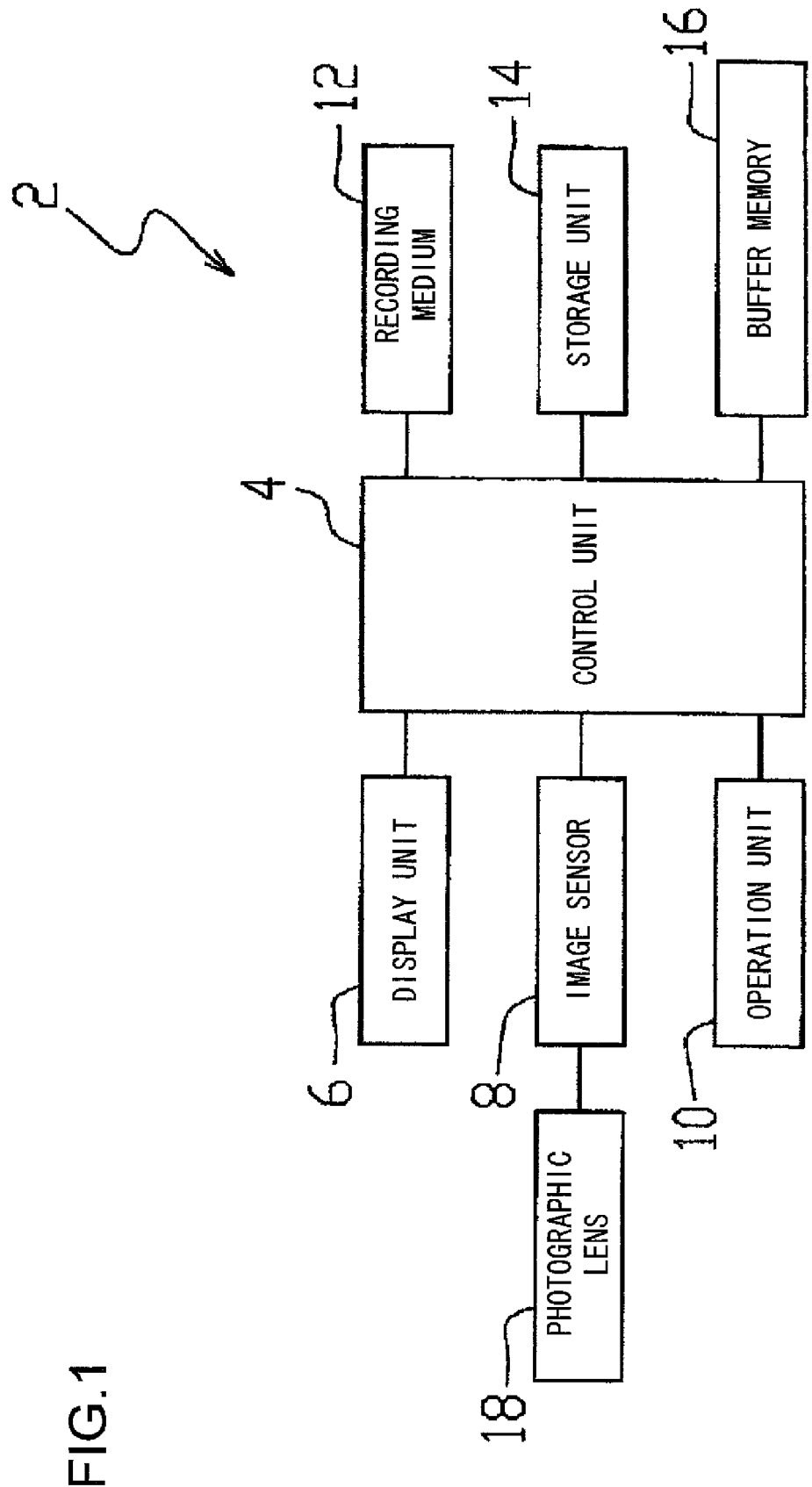
FIG. 1 is a block diagram showing the system configuration assumed in the digital camera achieved in a first embodiment of the present invention.

The following is a description of a digital camera embodying the image processing device according to the present invention, given in reference to drawings. FIG. 1 is a block diagram showing the system configuration assumed in the digital camera achieved in the embodiment. As shown in FIG. 1, the digital camera 2 includes a control unit 4, constituted with a microprocessor and the like, which executes overall control of the various units of the digital camera 2. A display unit 6, an image sensor 8, an operation unit 10, a recording medium 12, a storage unit 14 and a buffer memory 16 are connected to the control unit 4.

At the display unit 6 disposed at the rear surface of the casing of the digital camera 2, a live-view image, generated based upon image capturing signals provided from the image sensor 8 or a still image or a video image expressed by image data recorded in the recording medium 12 is displayed. The image sensor 8, which may be a CCD image sensor or a CMOS image sensor, captures an image formed with subject light via a photographic lens 18 and outputs the resulting image capturing signals to the control unit 4. The control unit 4 generates image data expressing a video image, a live-view image or the like by executing image processing such as resolution adjustment and exposure adjustment on the image capturing signals output from the image sensor 8.

The operation unit 10 is configured so as to include a shutter release button via which a shutter release instruction is issued, a mode button via which a specific photographing mode is selected so as to capture an image of the subject in the selected photographing mode, a cross key operated when selecting menu items or various settings, an OK button operated to confirm the selection of a menu item or a setting, and the like.

The recording medium 12 is a portable recording medium such as a CF card, an SD card or a smart medium that can be detachably loaded in a card slot (not shown). Still image data and video image data, generated by the control unit 4, are recorded into the recording medium 12.

A value or the like, representing a specific areal size, which is used when identifying a pixel cluster indicating a luminance level of 0 or a luminance level equal to or less than a predetermined value as an underexposure black-out area in an image frame generated based upon image capturing signals output from the image sensor 8 during a video shooting operation by referencing the luminance distribution in the image frame, is stored in the storage unit 14. In the buffer memory 16, image frames generated based upon image capturing signals output from the image sensor 8 while shooting a video image are temporarily stored.

Figure 2:
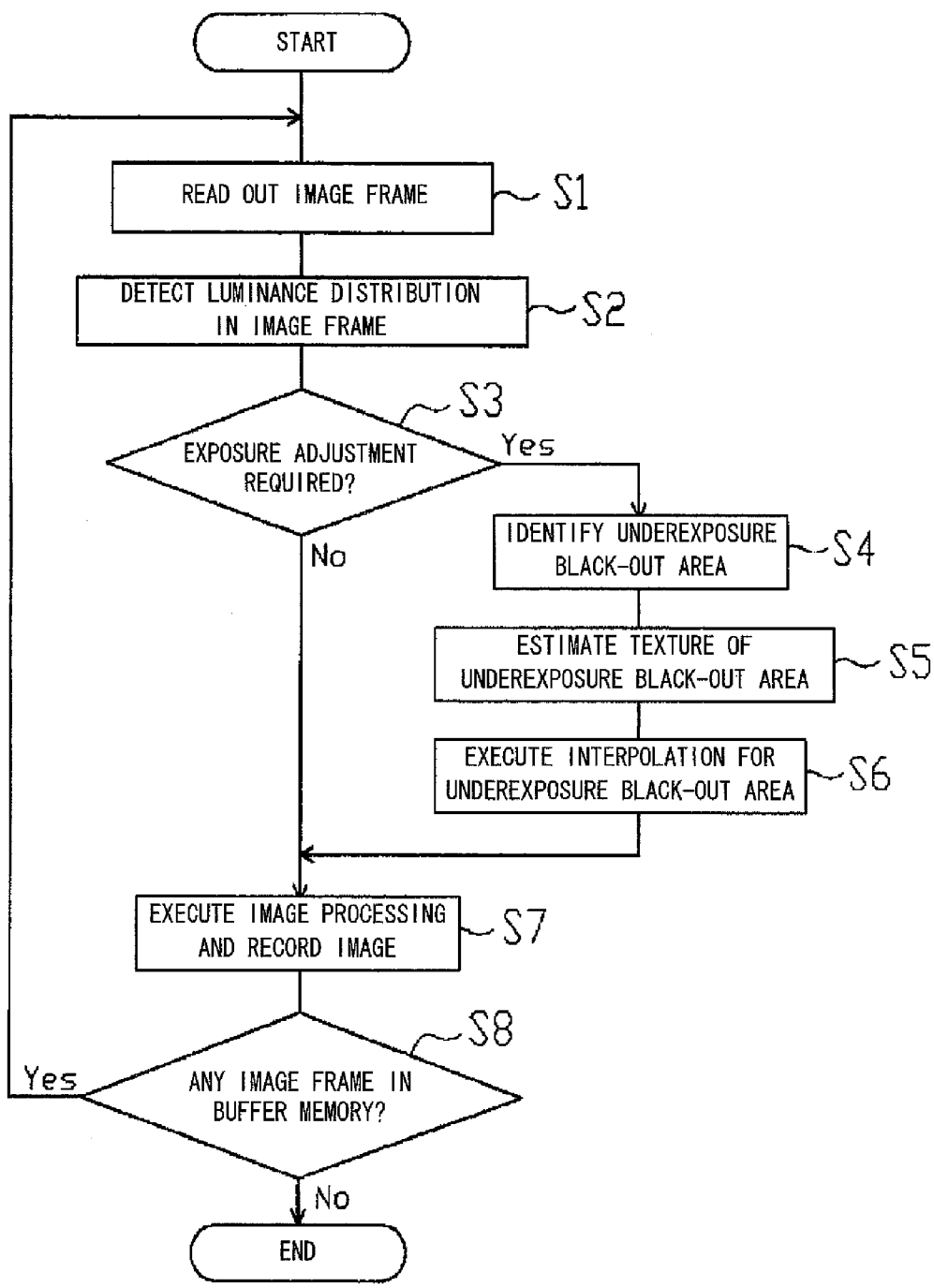
FIG. 2 presents a flowchart of video shooting processing executed in the digital camera in the first embodiment.

Next, the video shooting processing executed in the digital camera 2 will be described in reference to the flowchart presented in FIG. 2. The user, having already selected a video shooting mode via the operation unit 10, presses the shutter release button in order to issue a video shooting start instruction. In response, the control unit 4 starts a video shooting operation, generates an image frame based upon image capturing signals provided from the image sensor 8 and stores the image frame thus generated into the buffer memory 16. It is to be noted that the control unit 4 continues to store successive image frames into the buffer memory 16 until the user issues a video shooting stop instruction by pressing the shutter release button again.

The control unit 4 reads out the oldest image frame (step S1) among the image frames stored in the buffer memory 16 in chronological order. The control unit 4 detects the luminance distribution in the image frame having been read out (step S2) and temporarily stores the detected luminance distribution in the storage unit 14.

The control unit 4 executes predetermined image processing such as white balance adjustment and edge enhancement for the first image frame read out and records the resulting image frame into the recording medium 12. For each of the image frames read out second and onward, the control unit 4 compares the detected luminance distribution with the luminance distribution of the previous image frame stored in the storage unit 14 and makes a decision (step S3), based upon the comparison results, as to whether or not the particular image frame requires exposure adjustment. Namely, if the comparison results obtained by comparing the luminance distribution of the current image frame with the luminance distribution of the previous image frame indicate that the bright areas in the current image frame are attenuated by a specific extent compared to the previous image frame, the control unit 4 decides that the current image frame requires exposure adjustment (yes in step S3), and extracts the image frame as a target image frame requiring exposure adjustment.

The control unit 4 identifies an underexposure black-out area in the target image frame (step S4). In more specific terms, the control unit 4 identifies a pixel cluster taking up an area equal to or greater than the areal size value stored in the storage unit 14, among pixel clusters manifesting luminance, the levels of which are equal to 0 or equal to or less than a predetermined value, as an underexposure black-out area.

Figure 3:
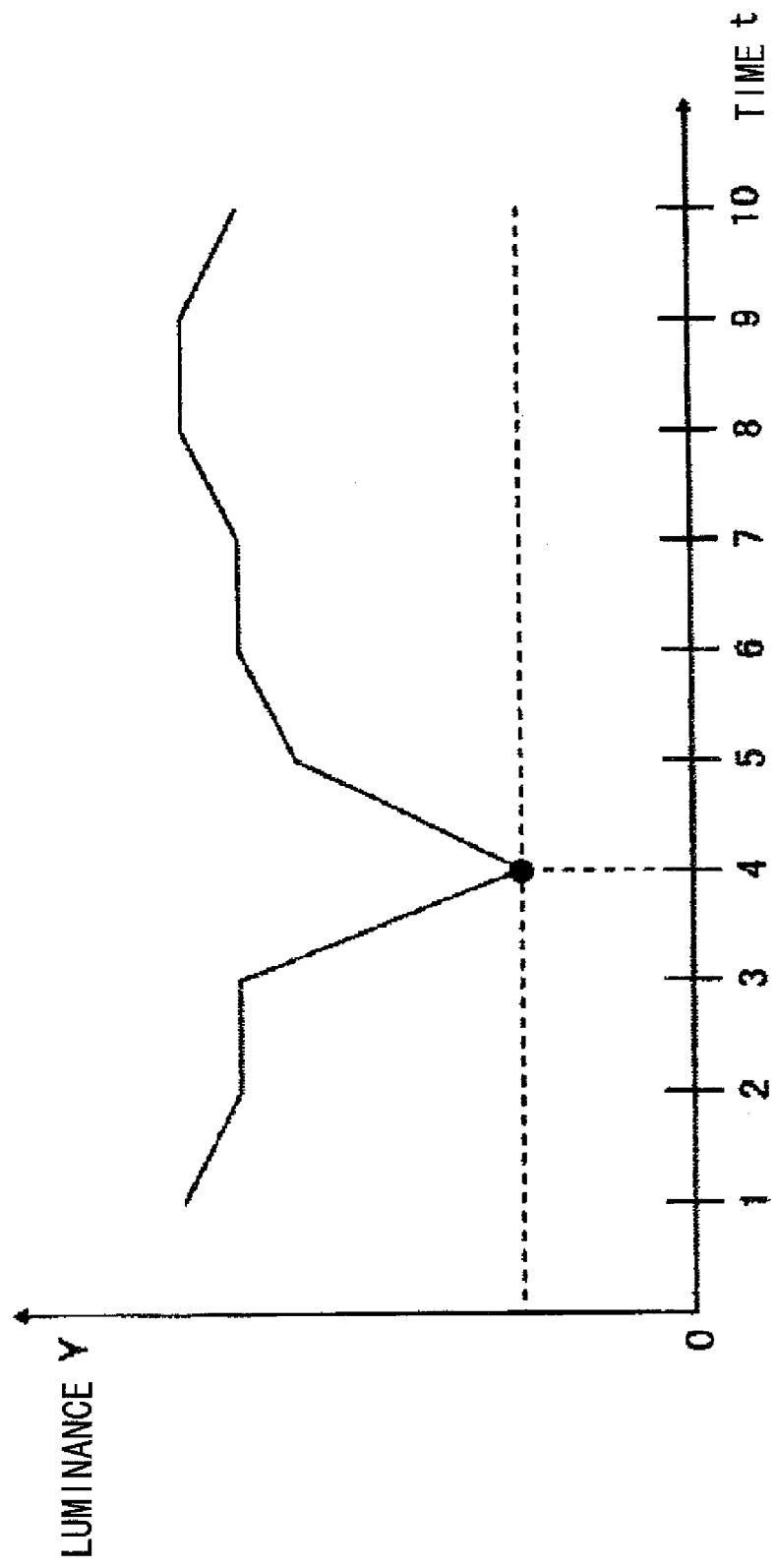
FIG. 3 is a graph indicating how the luminance in a specific area in the individual image frames changes over time during a video shooting operation.

FIG. 3 is a graph indicating how the luminance in a specific area changes from one image frame to the next as time elapses during a video shooting operation, with the time (t) indicated along the horizontal axis and the luminance (Y) indicated along the vertical axis. The graph indicates that the luminance in the specific area in the image frame generated at the time point t=4 is much lower than the levels of luminance in the specific area in the image frames preceding and following the particular image frame. It is to be noted that the specific area is identified as an underexposure black-out area at the time point t=4. In the example presented in FIG. 3, the level of luminance in the specific area in the image frame generated at the time point t=4, constituting part of the video image obtained through the video shooting operation, is much lower than the levels of luminance in the specific area in the image frames preceding and following the image frame generated at the time point t=4, and accordingly, the image frame generated at the time point t=4 is extracted as a target image frame requiring exposure adjustment and the underexposure black-out area is identified in this target image frame.

Figure 12:
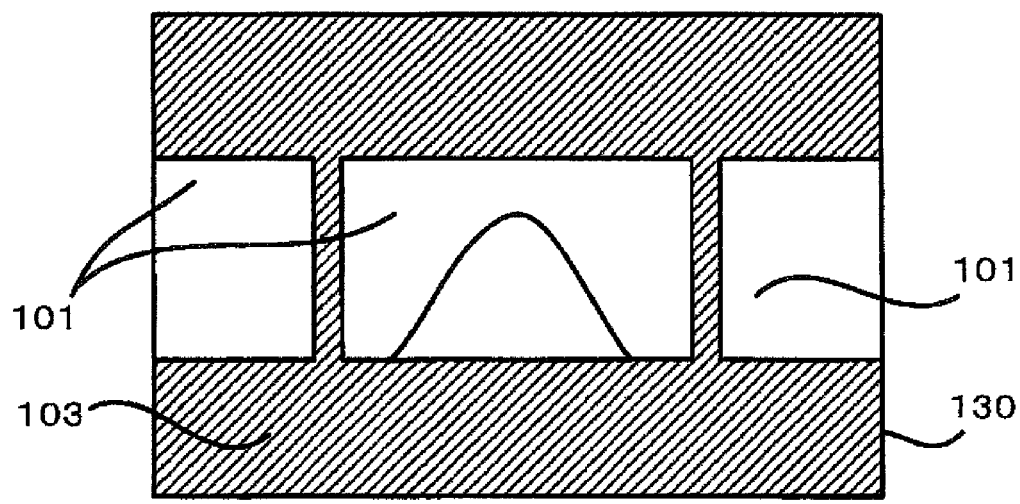
FIG. 12 presents an example of an image that may result from tone curve-based exposure correction executed for the image shown in FIG. 11(a).

If the subject of the video being shot is a view of an outdoor scene as seen through a window, the image frame generated at the time point t=4 may include the outside scene viewed through the window taking on a high level of brightness with the remaining area rendered dark, as shown in FIG. 4(a). Under such circumstances, while the details of the scene captured in the bright areas in this image frame will emerge as shown in FIG. 4(b) through tone curve-based gradation adjustment and/or gain-increase adjustment executed for the image frame, the underexposure black-out area will remain dark. It is to be noted that FIG. 11(a) and FIG. 12 are schematic representations of the images shown in FIG. 4(a) and FIG. 4(b) respectively.

Figure 5:
FIG. 5 shows an underexposed black-out area identified in the image frame.

Accordingly, the control unit 4 identifies an underexposure black-out area and then estimates the texture of the identified underexposure black-out area. Namely, assuming that the image frame shown in FIG. 4(a) has been extracted as a target image frame, the control unit 4 identifies the area other than the scene viewed through the window, as an underexposure black-out area, as shown in FIG. 5. The control unit 4 then estimates the texture of the underexposure black-out area thus identified (step S5). Namely, the control unit 4 estimates the texture at a location corresponding to the underexposure black-out area by executing alignment processing whereby the target image frame is aligned with one of the image frames generated before and after the target image frame. It is to be noted that FIG. 11(a) and FIG. 11(c) respectively provide schematic representations of the conditions shown in FIG. 4(a) and FIG. 5.

It is to be noted that the alignment processing may be executed by adopting a multi-axis LK method of the known art, the multi axes including the vertical direction, the horizontal direction, the rotational direction, the scaling transformation, the affine transformation and the like, so as to align the object corresponding to the underexposure black-out area with a high level of accuracy. In other words, highly accurate alignment for the object corresponding to the underexposure black-out area can be achieved by adopting the Lucas-Kanade method, which incorporates operations of the known art such as vertical translation, horizontal translation, rotation, scaling transformation and affine transformation.

Figure 6:
FIG. 6 shows an image frame generated at the time point t=3 in FIG. 3.
Figure 7:
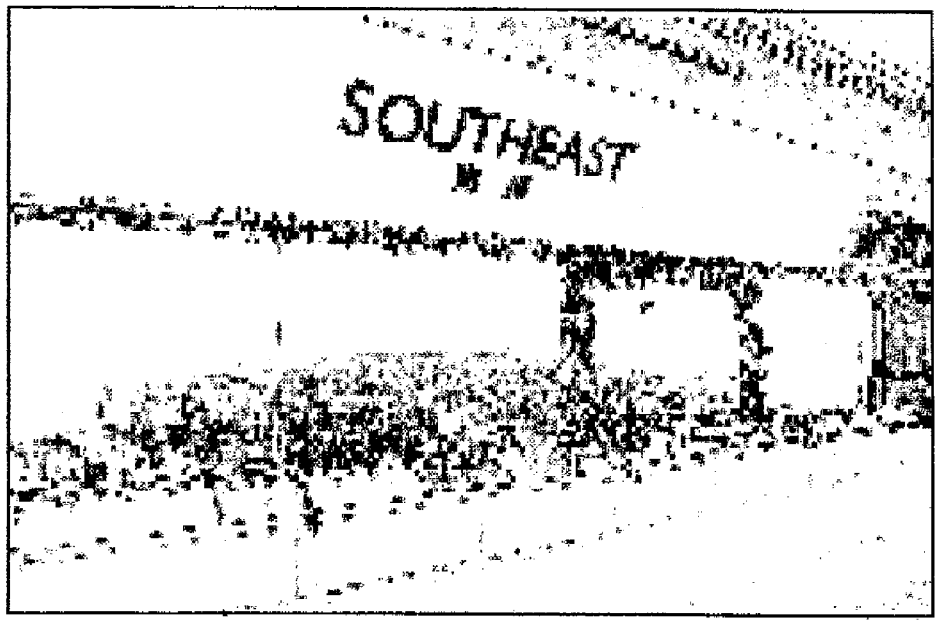
FIG. 7 shows a texture image created based upon the image frame generated at the time point t=3 in FIG. 3.
Figure 8:
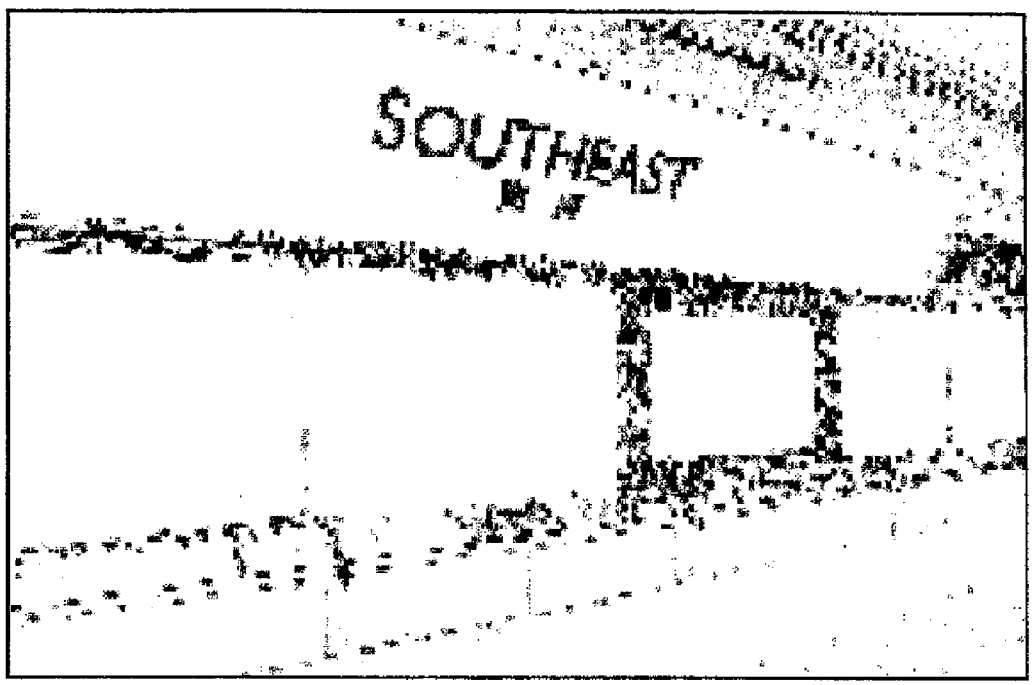
FIG. 8 shows a texture image corresponding to the underexposed black-out area.

Namely, the control unit 4 estimating the texture of the underexposure black-out area by using the image frame having been generated at the time point t=3 and recorded in the buffer memory 16 (hereafter referred to as a previous image frame), for instance, first generates a texture image corresponding to the previous image frame in which the texture of the underexposure black-out area is captured as shown in FIG. 6. This texture image shows the texture in the previous image frame including the underexposure black-out area, as shown in FIG. 7. Next, the control unit 4 estimates, based upon the texture image, the texture of the underexposure black-out area, i.e., the area other than the view seen through the windows, as shown in FIG. 8. It is to be noted that FIG. 11(*b*), FIG. 14(*a*) and FIG. 14(*b*) respectively provide schematic representations of the images shown in FIG. 6, FIG. 7 and FIG. 8.

The control unit 4 executes interpolation for the underexposure black-out area by using the texture having been estimated for the underexposure black-out area (step S6). Namely, the control unit 4 synthetically generates data expressing the texture, having been estimated based upon the texture image, for the underexposure black-out area in the target image frame. As a result, the target image frame is rendered into an image frame possessing information related to the texture in the underexposure black-out area, as shown in FIG. 9(*a*). Thus, the control unit 4 is able to obtain an image frame in which the texture of the underexposure black-out area is picked up, as shown in FIG. 9(*b*), by executing tone curve-based gradation adjustment for the target image frame. It is to be noted that FIG. 17(*a*) and FIG. 17(*b*) respectively provide schematic representations of the images shown in FIG. 9(*a*) and FIG. 9(*b*).

After executing interpolation for the underexposure black-out area in step S6 or after deciding in step S3 that the current image frame does not require exposure adjustment (no in step S3), the control unit 4 executes predetermined image processing on the image frame and then records the resulting image frame into the recording medium 12 (step S7). Once the image frame is recorded into the recording medium 12, the control unit 4 makes a decision as to whether or not there is an image frame remaining in the buffer memory 16 (step S8). Upon deciding that there is an image frame remaining in the buffer memory 16 (yes in step S8), the control unit 4 returns to step S1 to read out the next image frame and detect the luminance distribution in the image frame. If, on the other hand, the control unit 4 decides that there is no more image frame remaining in the buffer memory 16 (no in step S8), it ends the video shooting processing.

The digital camera achieved in this embodiment is capable of generating an image frame with the texture in an underexposure black-out area contained therein restored through interpolation. Thus, an image with a natural look can be generated even when gain processing is executed as part of the exposure adjustment. In addition, since the interpolation is executed only for an underexposure black-out area in the target image frame, blurring in the background or the like, which tends to occur when combining two image frames through, for instance, HDR imaging, can be prevented.

It is to be noted that while interpolation is executed for the underexposure black-out area in an image frame during a video shooting operation in the embodiment described above, interpolation may be executed for the underexposure black-out area after the video shooting operation is completed, instead. In such a case, the luminance distribution of each image frame recorded in the recording medium 12 should be compared with the luminance distribution in the preceding or following image frame, any image frame requiring exposure adjustment can be extracted based upon the comparison results and the texture of the underexposure black-out area can be estimated and interpolation for the underexposure black-out area can be estimated and interpolation can be executed for the underexposure black-out area, as has been described earlier, by using the image frame preceding or following the extracted image frame.

In addition, the texture of the underexposure black-out area may be estimated by dividing the underexposure black-out area into smaller areas after the alignment processing is executed to align the target image frame with the preceding or following image frame, calculating vectors of the individual small areas and optimizing the weight ratio of the vectors between the preceding or following image frame and the target image frame.

Moreover, while an explanation has been given on an example in which the present invention is adopted to correct underexposure black-out in an image, it will be obvious that the method described in reference to the first embodiment may be adopted when interpolating data for an area where image gradations are missing due to, for instance, overexposure white-out or gradation saturation, as well as in the correction of underexposure black-out in an image.

While the invention has been particularly shown and described with respect to the specific embodiment above, the scope of the present invention is not limited to the above described embodiment.

Second Embodiment

Figure 10:
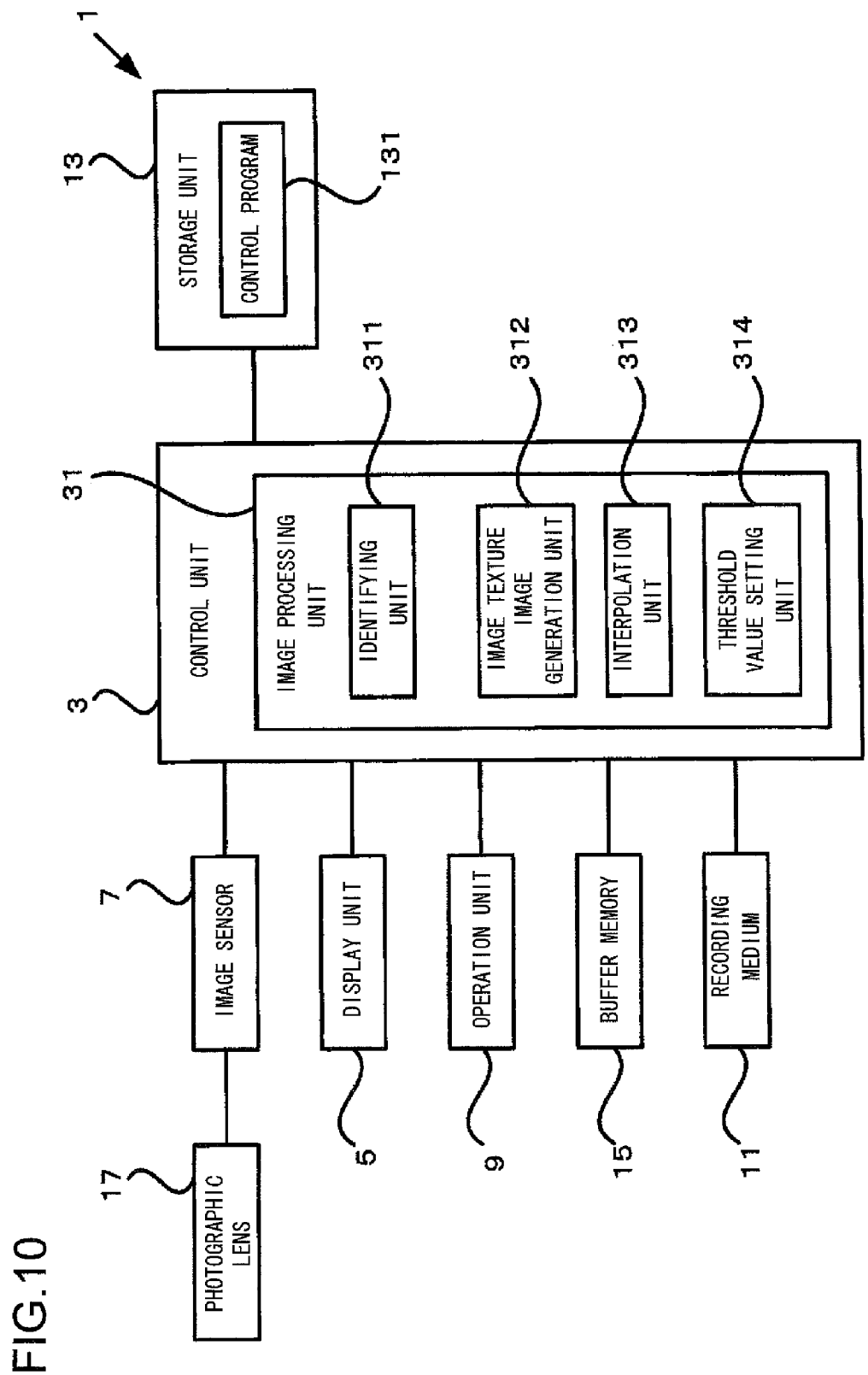
FIG. 10 is a block diagram showing the system configuration assumed in a digital camera achieved in a second embodiment of the image processing device.

The following is a description of a digital camera achieved as the second embodiment of the image processing device according to the present invention. FIG. 10 is a block diagram showing the system configuration assumed in the digital camera 1. The digital camera 1 can be engaged in a still image photographing operation, a video shooting operation and a continuous shooting operation. As shown in FIG. 10, the digital camera 1 includes a control unit 3, a display unit 5, an image sensor 7, an operation unit 9, a recording medium 11, a storage unit 13, a buffer memory 15 and a photographic lens 17.

The control unit 3 may be constituted with, for instance, a microprocessor and the like. The control unit 3 is able to control the various units of the digital camera 1 by executing a control program 131 pertaining to the control of the digital camera 1, which is stored in the storage unit 13. The control unit 3 is capable of functioning as, for instance, an image processing unit 31, which will be described in detail later.

The display unit 5 is a liquid crystal display device that may be disposed at, for instance, the rear surface of the casing of the digital camera 1.

At the display unit 5, various types of menu screens, a live-view image generated based upon image capturing signals provided from the image sensor 7, a still image or a video image expressed based upon image data recorded in the recording medium 11, and the like, are displayed.

The image sensor 7 may be, for instance, a CCD image sensor or a CMOS image sensor. A light flux traveling from a subject passes through the photographic lens 17 and is then guided toward an imaging surface of the image sensor 7. The image sensor 7 captures a subject image formed on the imaging surface. On the imaging surface of the image sensor 7, image capturing pixels with red (R) color filters disposed thereat, image capturing pixels with green (G) color filters disposed thereat and image capturing pixels with blue (B)

color filters disposed thereat, for instance, are disposed in a Bayer array. The image sensor 7 outputs image capturing signals generated in the RGB colorimetric system toward the control unit 3. The control unit 3 converts the image capturing signals to digital signals with a predetermined number of gradations (e.g., 256) through A/D conversion and also executes various types of image processing via the image processing unit 31 so as to generate image data expressing a video image, a still image, a live-view image or the like.

The operation unit 9 includes operation members via which the user is able to perform input operations at the digital camera 1. The operation unit 9 is configured so as to include, for instance, a power switch via which the digital camera 1 is turned on, a shutter release button via which a shutter release instruction is issued, a mode button via which a specific photographing mode is selected so as to capture an image of the subject in the selected photographing mode, a cross key operated when selecting menu items or various settings, an OK button operated to confirm the selection of a menu item or a setting, and the like.

The recording medium 11 is a non-volatile storage area. The recording medium 11 is loaded in the camera in the form of, for instance, a CF card or an SD card. Image data generated by the control unit 3 and the like are recorded in the recording medium 11.

The storage unit 13 is constituted with a ROM, a hard disk, a flash memory and/or the like. In the storage unit 13, information related to settings of the digital camera 1 and the like, as well as the control program 131, are stored.

The buffer memory 15, constituted with a RAM and/or the like, includes a storage area where data are temporarily stored. For instance, images corresponding to individual frames are stored on a temporary basis in the buffer memory 15 while a video shooting operation is underway. It is to be noted that the image in each frame is generated by the image processing unit 31 based upon image capturing signals provided from the image sensor 7.

Unless the correct exposure settings and the like are selected in an image capturing device such as the digital camera 1, image data obtained through a photographing operation executed therein may manifest a phenomenon often referred to as underexposure black-out or overexposure white-out. The term "underexposure black-out" refers to a state in which gradations are lost in a dark area of the subject image, which may occur when, for instance, the luminance at various pixel positions corresponding to the dark area in the subject image uniformly assumes the minimum value (e.g., 0). The term "overexposure white-out" refers to a state in which gradations are lost in a bright area of the subject image, which may occur when, for instance, the luminance at various pixel positions corresponding to the bright area of the subject image uniformly assume the maximum value.

In addition, unless the correct contrast setting and the like are selected in an image capturing device such as the digital camera 1, a phenomenon often referred to as color saturation may occur during a photographing operation. The term "color saturation" refers to a state in which gradations are lost in an area assuming a given hue in the subject image, which may occur when the chromaticity (chroma) at various pixel positions corresponding to an area where a subject (e.g., a red flower) assuming a specific hue is captured uniformly takes on the maximum value.

The gradations that are lost as described above cannot be restored through tone curve-based adjustment or the like. For instance, even if an image area (pixel cluster) where underexposure black-out has occurred is adjusted based upon a tone curve or the like, the image area with the underexposure black-out will simply take on a uniformly lighter tone without restoring the gradations in the area.

The image processing unit 31 is capable of executing image processing referred to as gradation interpolation processing in order to repair an image in which the gradations have been lost, as described above, through interpolation. FIG. 10 shows an identifying unit 311, an image texture image generation unit 312, an interpolation unit 313 and a threshold value setting unit 314, all engaged in the gradation interpolation processing.

(Identifying Unit 311)

The identifying unit 311 identifies an image area (pixel cluster) that matches one of the following conditions in image data generated through image capturing operation executed in the digital camera 1 and recorded in the buffer memory 15 or the recording medium 11 and records image data of a target image for the gradation interpolation processing into the buffer memory 15.

First condition: the image area (pixel cluster) is made up with at least a predetermined number of contiguous pixels, each of which has the luminance equal to or less than a first threshold value Second condition: the image area (pixel cluster) is made up with at least a predetermined number of contiguous pixels, each of which has the luminance equal to or greater than a second threshold value Third condition: the chromaticity remains equal to or greater than a third threshold value through at least a predetermined number of contiguous pixels in the image area (pixel cluster) is made up with at least a predetermined number of contiguous pixels, each of which has the chromaticity equal to or greater than a third threshold value An image area (pixel cluster) matching the first condition contains pixels at which underexposure black-out has occurred. An image area (pixel cluster) matching the second condition contains pixels at which overexposure white-out has occurred. An image area (pixel cluster) matching the third condition contains pixels at which color saturation has occurred. Preselected specific values may be set as the first threshold value, the second threshold value and the third threshold value, or the threshold value setting unit 314 may adjust the value settings for the first, second and third threshold values.

In reference to FIGS. 11(*a*) through 11(*c*), the identifying unit 311 will be described. FIG. 11(*a*) presents an example of a captured image 100 in which underexposure black-out has occurred. FIG. 11(*b*) shows a captured image obtained by photographing the same subject as that in FIG. 11(*a*) with the optimal exposure settings selected in the digital camera 1. It is to be noted that in FIG. 11 and subsequent figures, different levels of luminance at various image capturing pixels are indicated with different hatching densities and that a darker image area is more densely hatched.

A captured image 110 shown in FIG. 11(*b*) includes image areas 101 in which images of windows are captured and a character image 102 of a guidance indication "SOUTH EAST". The captured image 100 shown in FIG. 11(*a*) is darker on the whole compared to the captured image 110 shown in FIG. 11(*b*) and manifests underexposure black-out in an image area 103 other than the window image areas 101. Thus, gradations corresponding to the guidance indication character image 102 are lost in FIG. 11(*a*). It is to be noted that even if tone curve-based exposure adjustment is executed for the captured image 100 in FIG. 11(*a*), the gradations corresponding to the guidance indication character image 102, having been lost due to underexposure black-out, cannot be restored, as indicated in FIG. 12, showing an image 130.

FIG. 11(*c*) presents an example of an image 120 that may be obtained through the processing executed by the identifying unit 311 for the captured image 100 shown in FIG. 11(*a*). In the image 120 in FIG. 11(*c*), the image area 103 matching the first condition in the image shown in FIG. 11(*a*) is identified by the identifying unit 311. In addition, the images in the window image areas 101 in FIG. 11(*a*), in which the gradations are not lost, are not identified by the identifying unit 311 in the image 120.

Figure 13:
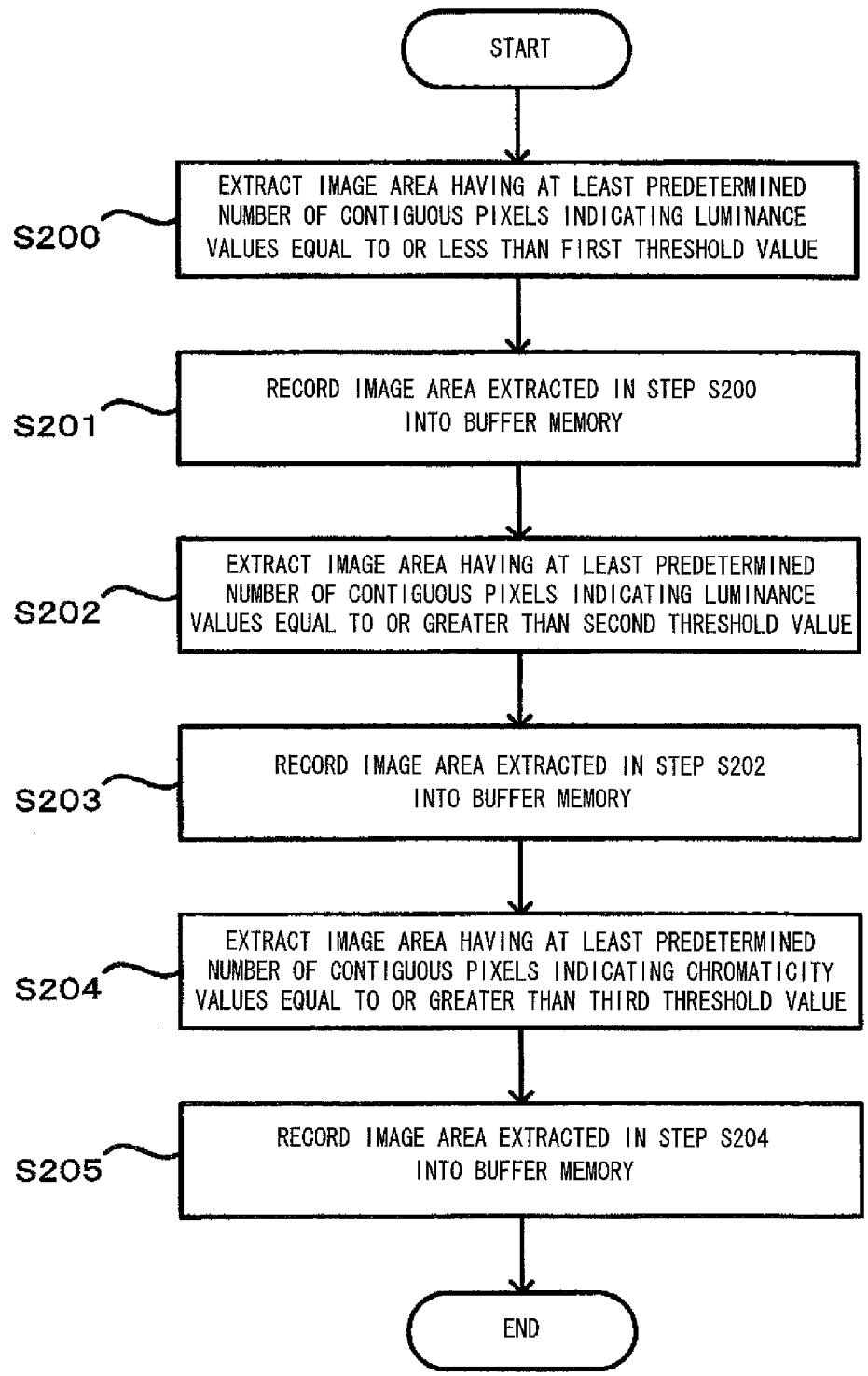
FIG. 13 presents a flowchart of the processing executed by engaging the identifying unit.

FIG. 13 presents a flowchart of processing that may be executed by engaging the identifying unit 311. The processing shown in FIG. 13 is executed by the control unit 3 after image data are recorded into the buffer memory 15. In step S200, the control unit 3 extracts an image area containing at least a predetermined number of contiguous pixels at which the luminance takes on values equal to or less than the first threshold value. Through this processing, an image area matching the first condition is extracted. In step S201, the control unit 3 records image data pertaining to the image area having been extracted in step S200 into the buffer memory 15. In the example presented in FIG. 11, the control unit 3 records the image data corresponding to the image 120 in FIG. 11(*c*) into the buffer memory 15.

In step S202, the control unit 3 extracts an image area containing at least a predetermined number of contiguous pixels at which the luminance takes on values equal to or greater than the second threshold value. Through this processing, an image area matching the second condition is extracted. In step S203, the control unit 3 records image data pertaining to the image area having been extracted in step S202 into the buffer memory 15. It is to be noted that no area matching the second condition exists in the example presented in FIG. 11.

In step S204, the control unit 3 extracts an image area containing at least a predetermined number of contiguous pixels at which the chromaticity takes on values equal to or greater than the third threshold value. Through this processing, an image area matching the third condition is extracted. In step S205, the control unit 3 records image data pertaining to the image area having been extracted in step S204 into the buffer memory 15. It is to be noted that no area matching the third condition exists in the example presented in FIG. 11.

In the following description, image information for a captured image in which an image area is identified by the identifying unit 311 will be referred to as pre-interpolation image data $G_O$. In addition, image data corresponding to an image area matching the first condition, the second condition or the third condition, which are recorded by the identifying unit 311 into the buffer memory 15, will be referred to as target image data $G_T$. It is to be noted that target image data $G_T$ are recorded in the buffer memory 15 as separate sets of image information each matching a specific condition. Specific masking data are stored for any image area that is not identified by the identifying unit 311 in the target image data $G_T$.

(Image Texture Image Generation Unit 312)

The image texture image generation unit 312 identifies the image texture in the image area having been identified by the identifying unit 311. In the description of the present invention, the term "image texture" is used to refer to luminance gradation information pertaining to the luminance gradations within the particular image area and edge information pertaining to any edge present within the image area. The image texture image generation unit 312 generates image data, which will be referred to as an image texture image, in correspondence to the estimated image texture. An image texture image such as that shown in FIG. 14(*b*) may be generated for the image in FIG. 11(*c*). An area that corresponds to the image area 103 in FIG. 11(*c*) is extracted from the image area in FIG. 14(*a*), in the example presented in FIG. 14(*b*).

The image texture image generation unit 312 generates image texture image data based upon image information referred to as reference image data $G_R$ and the target image data $G_T$. The reference image data $G_R$, stored in the recording medium 11, the storage unit 13, the buffer memory 15 or the like, are image data different from the pre-interpolation $G_O$, which express a captured image of the same subject as that of the image expressed by the pre-interpolation captured image data $G_O$. Specific image data selected by the user from image data stored in the recording medium 11, the storage unit 13, the buffer memory 15 or the like may be used as the reference image data $G_R$, or the image texture image generation unit 312 may select specific image data, among image data stored in the recording medium 11, the storage unit 13, the buffer memory 15 or the like, to be used as the reference image data $G_R$.

It is desirable that captured image data expressing an image in which no image area has been identified by the identifying unit 311 be used as the reference image data $G_R$. At the very least, image information for a captured image in which no area matching the same condition as that used as the identifier in the pre-interpolation image data $G_O$ to undergo the interpolation processing has been identified should be preferably used as the reference image data $G_R$. If, for instance, the pre-interpolation image data $G_O$ express an image frame in a video image shot through an ongoing video shooting operation, an image frame manifesting a luminance (chromaticity) in a dark area or a bright area, which is different from that indicated in the luminance distribution in the current frame by a predetermined extent or more should be selected. More specifically, an image frame manifesting luminance in a bright area thereof, which is different from the luminance in the target image data $G_T$ matching the first condition by a predetermined extent or more, should be selected. An image frame manifesting luminance in a dark area thereof, which is different from the luminance in the target image data $G_T$ matching the second condition by a predetermined extent or more, should be selected. An image frame manifesting chromaticity over the entire image, which is different from the chromaticity in the target image data $G_T$ matching the third condition by a predetermined extent or more should be selected.

Figure 15:
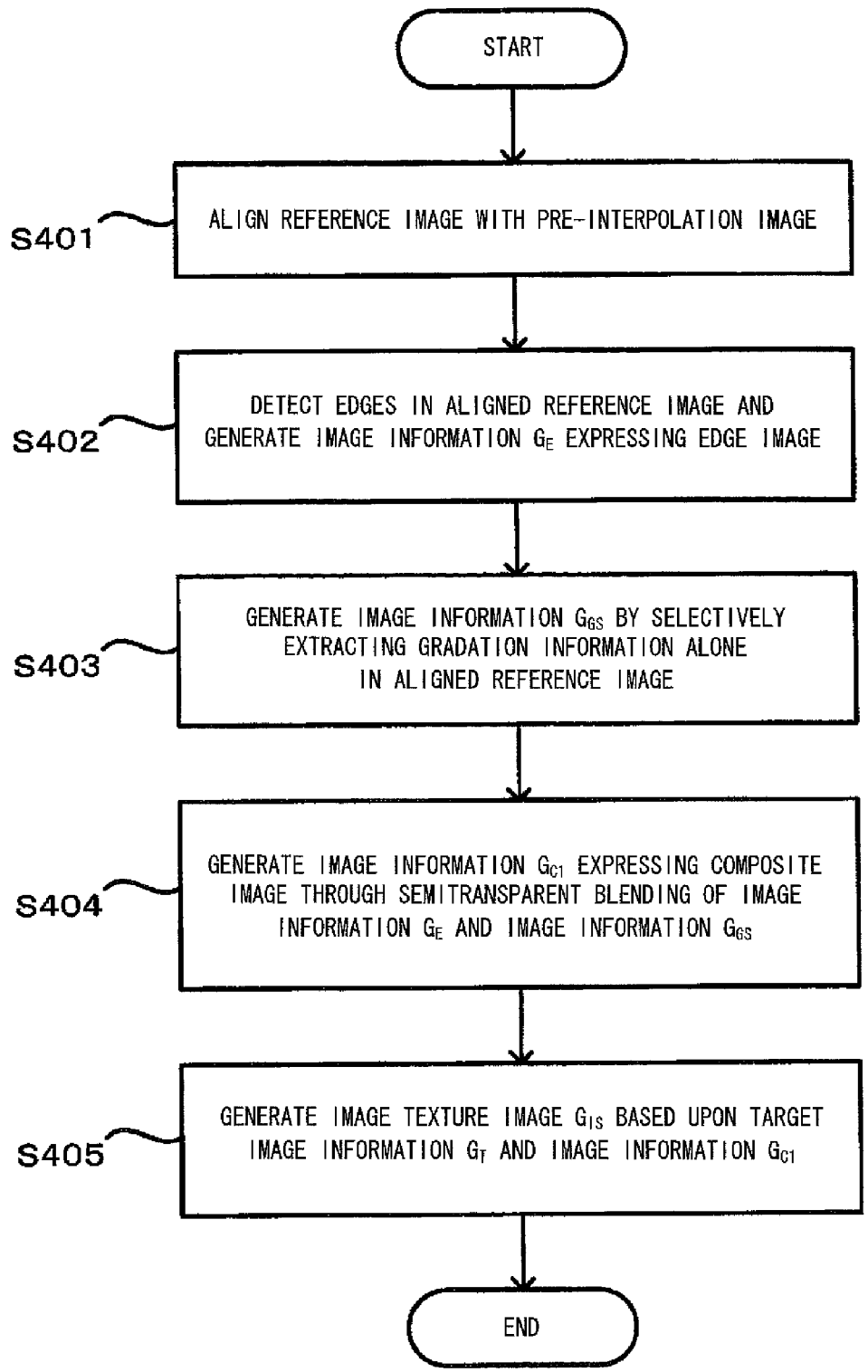
FIG. 15 presents a flowchart of processing executed by engaging the image texture image generation unit.

FIG. 15 presents a flowchart of processing that may be executed by engaging the image texture image generation unit 312. The processing shown in FIG. 15 is executed by the control unit 3. The reference image data $G_R$ will have been selected before the processing shown in FIG. 15 starts.

In step S401, the control unit 3 executes image alignment processing by using the pre-interpolation image data $G_O$ and the reference image data $G_R$. The alignment processing may be executed by adopting a method of the known art, such as the Lucas-Kanade method or the block matching method.

In step S401, the control unit 3 detects edges in the reference image data $G_R$ having undergone the alignment processing. The control unit 3 then generates image data $G_E$ corresponding to an edge image exclusively made up with the edges detected through the edge detection. In step S403, the control unit 3 generates image data $G_{GS}$ by extracting only the gradation information pertaining to the luminance of the reference image data $G_R$ having undergone the alignment processing. In this step, the control unit 3 may generate the image data $G_{GS}$ by, for instance, first converting the aligned reference image data $G_R$ to gray scale data and then further executing a predetermined type of gradation conversion on the gray scale data.

In step S404, the control unit 3 generates composite image data $G_{C1}$ through semitransparent blending of the image data $G_E$ having been generated in step S402 and the image data $G_{GS}$ having been generated in step S403. The semitransparent blending process may be executed by adopting a method of the known art such as alpha blending. FIG. 14(*a*) presents an example of a composite image that may be generated through step S404. A composite image 140 shown in FIG. 14(*a*) contains edge information and luminance gradation information corresponding to the window image areas 101 and the image area 103 other than the window image areas 101.

In step S405, the control unit 3 generates image data $G_{IS}$ expressing an image texture image based upon the target image data $G_T$ and the image data $G_{C1}$. In this step, the image data corresponding to the image area, which is part of the image data $G_{C1}$ but has not been identified by the identifying unit 311, may be switched to specific masking data based upon, for instance, the masking data included in the target image data $G_T$. FIG. 14(*b*) presents an example of an image texture image. An image texture image 150 shown in FIG. 14(*b*) is generated by extracting the image portion in the composite image 140 in FIG. 14(*a*), which corresponds to the image area 103 in FIG. 11(*c*). In other words, it is generated by extracting the image area other than the window image areas 101 in the image 120 in which the masking data are recorded.

It is to be noted that while the embodiment is described by assuming that the image data only include an area matching the first condition, in case of image data including areas matching a plurality of conditions corresponding to, for instance, overexposure white-out and gradation saturation, the area data corresponding to the areas respectively matching the conditions, too, should be switched to masking data. For instance, if the interpolation target image includes an area matching the second condition and also an area matching the third condition, the data corresponding to the image area that does not match the second data condition (the area matching the third condition and the area that does not match any of the first through third conditions) should be switched to masking data in order to extract the second data area and the data corresponding to the image area that does not match the third condition (the area matching the second condition and the area that does not match any of the first through third conditions) should be switched to masking data in order to extract the third data area.

(Interpolation Unit 313)

Figure 16:
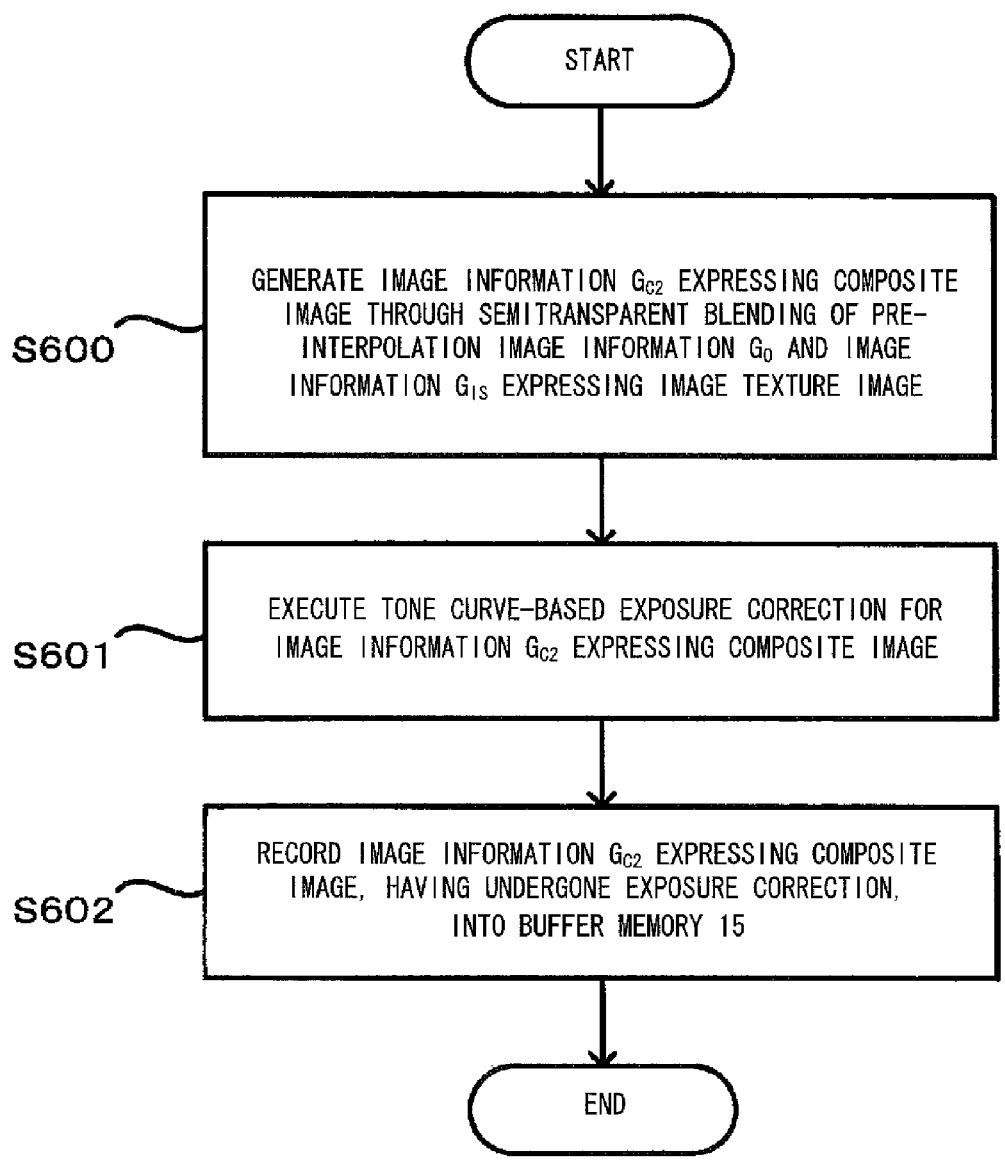
FIG. 16 presents a flowchart of the processing executed by engaging the interpolation unit.

The interpolation unit 313 executes interpolation for the pre-interpolation image data $G_0$ by using the image data $G_{IS}$ expressing the image texture image, which have been generated by the image texture image generation unit 312. FIG. 16 presents a flowchart of processing that may be executed by engaging the interpolation unit 313.

In step S600 in the flowchart presented in FIG. 16, the control unit 3 generates image data $G_{C2}$ expressing a composite image through semitransparent blending of the pre-interpolation image data $G_0$ and the image data $G_{IS}$ expressing the image texture image. The semitransparent blending process may be executed by adopting a method of the known art such as alpha blending.

FIG. 17(*a*) presents an example of a composite image that may be generated through step S600. FIG. 17(*a*) shows a composite image 160 generated through semitransparent blending of the captured image 100 shown in FIG. 11(*a*) and the image texture image 150 shown in FIG. 14(*b*).

According to the present invention, gradations can be restored through semitransparent blending whereby the image texture is blended in an image area in the pre-interpolation image data $G_0$ where gradations are substantially lost. In addition, according to the present invention, the identifying unit 311 identifies an area in the interpolation target image, where the image texture is lost and, a image texture image is incorporated only over an area corresponding to the identified area. Accordingly, it is possible to provide an interpolated image taking on a very natural look because a composite image is not synthetically generated by using a plurality of sets of captured image data obtained through continuous shooting while retaining the gradations in the overall image as performed in HDR.

In step S601, the control unit 3 executes tone curve-based exposure correction for the image data $G_{C2}$ expressing the composite image. An image 170 shown in FIG. 17(*b*) results from the tone curve-based exposure correction executed for the composite image 160 shown in FIG. 17(*a*). The guidance indication character image 102 in the image 170 in FIG. 17(*b*) has been repaired in an optimal manner.

If the interpolation processing is being executed for an image area matching the first condition, the control unit 3 executes the tone curve-based exposure correction in step S601 so as to lighten the entire composite image. If, on the other hand, the interpolation processing is being executed for an image area matching the second condition, the control unit 3 executes the tone curve-based exposure correction so as to darken the entire composite image. If the interpolation processing is being executed for an image area matching the third condition, the control unit 3 executes the tone curve-based exposure correction based upon the luminance distribution through the overall composite image.

In step S602, the control unit 3 records the image data $G_{C2}$, expressing the composite image having undergone the exposure correction, into the buffer memory 15. At this time, the control unit 3 may replace the pre-interpolation image data $G_0$ with these image data.

Figure 18:
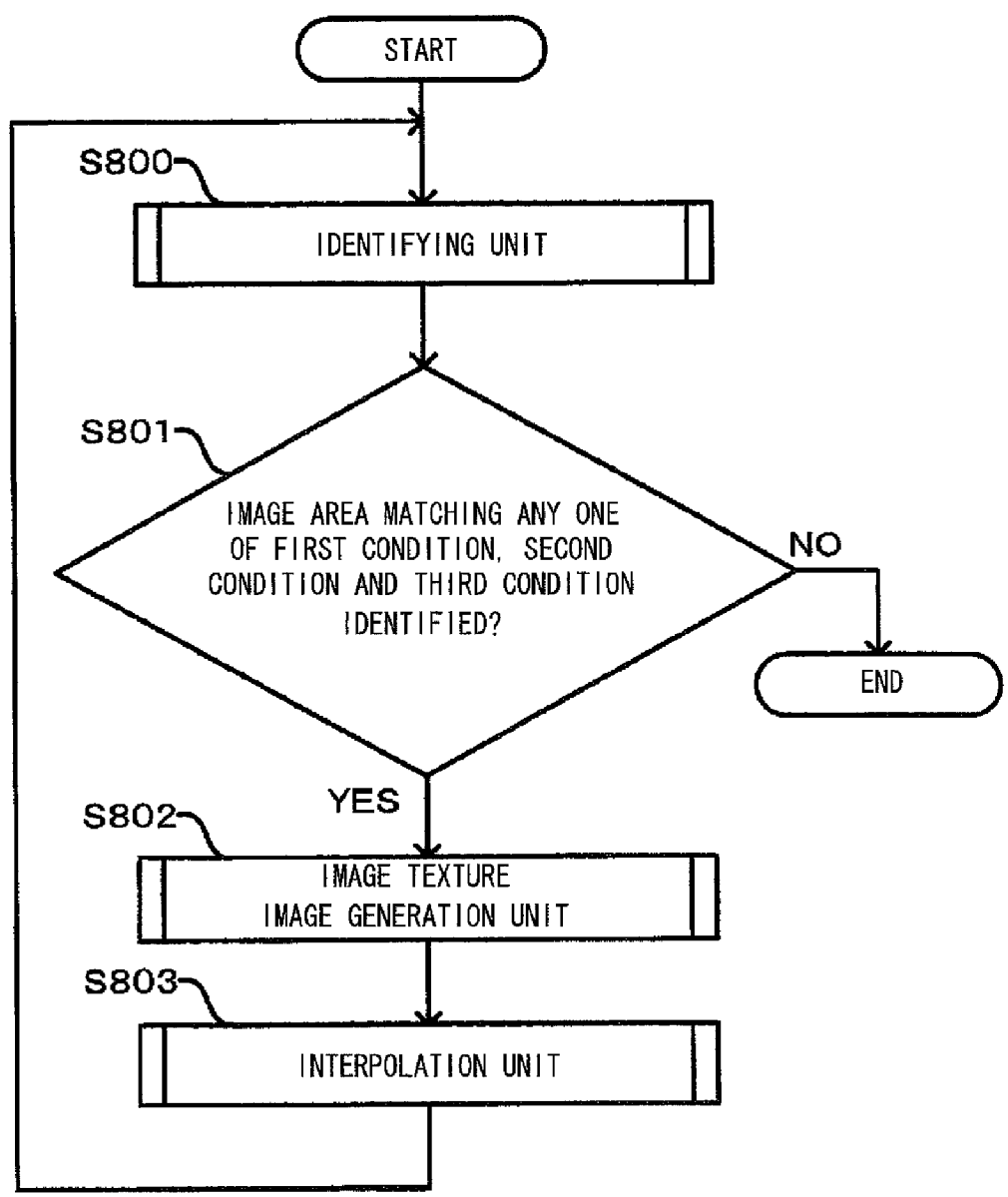
FIG. 18 presents a flowchart of gradation interpolation processing that may be executed in the image processing device.

FIG. 18 presents a flowchart of the overall interpolation processing executed for an image in which gradations are lost by incorporating the individual processing procedures described earlier. The execution of the processing shown in FIG. 18 starts if the results of comparison between the luminance distribution in the previous frame and the luminance distribution in the current frame indicate that the current frame manifests an increase/decrease in either the bright area or the dark area by a predetermined extent or more while, for instance, a video shooting operation is in progress.

In step S800 in FIG. 18, the control unit 3 engages the identifying unit 311 in processing such as that shown in FIG. 13. In step S810, the control unit 3 makes a decision as to whether or not the identifying unit 311 has identified an image area matching any one of the first condition, the second condition and the third condition. If an affirmative decision is made in step S801, the control unit 3 allows the processing to proceed to step S802, whereas if a negative decision is made in step S801, the control unit 3 ends the gradation interpolation processing. In step S802, the control unit 3 engages the image texture image generation unit 312 in processing such as that shown in FIG. 15. In step S803, the control unit 3 engages the interpolation generation unit 313 in processing such as that shown in FIG. 16.

(Threshold Value Setting Unit 314)

The threshold value setting unit 314 individually adjusts the value settings for the first threshold value corresponding to the first condition, the second threshold value corresponding to the second condition and the third threshold value corresponding to the third condition mentioned earlier. Based upon the value settings adjusted by the threshold value setting unit 314 for the individual threshold values, the identifying unit 311 is able to correctly identify an image area during a video shooting operation, a still image continuous shooting operation or the like. The following is an explanation of how the first threshold value, chosen as a typical example, is set during a video shooting operation.

Figure 19:
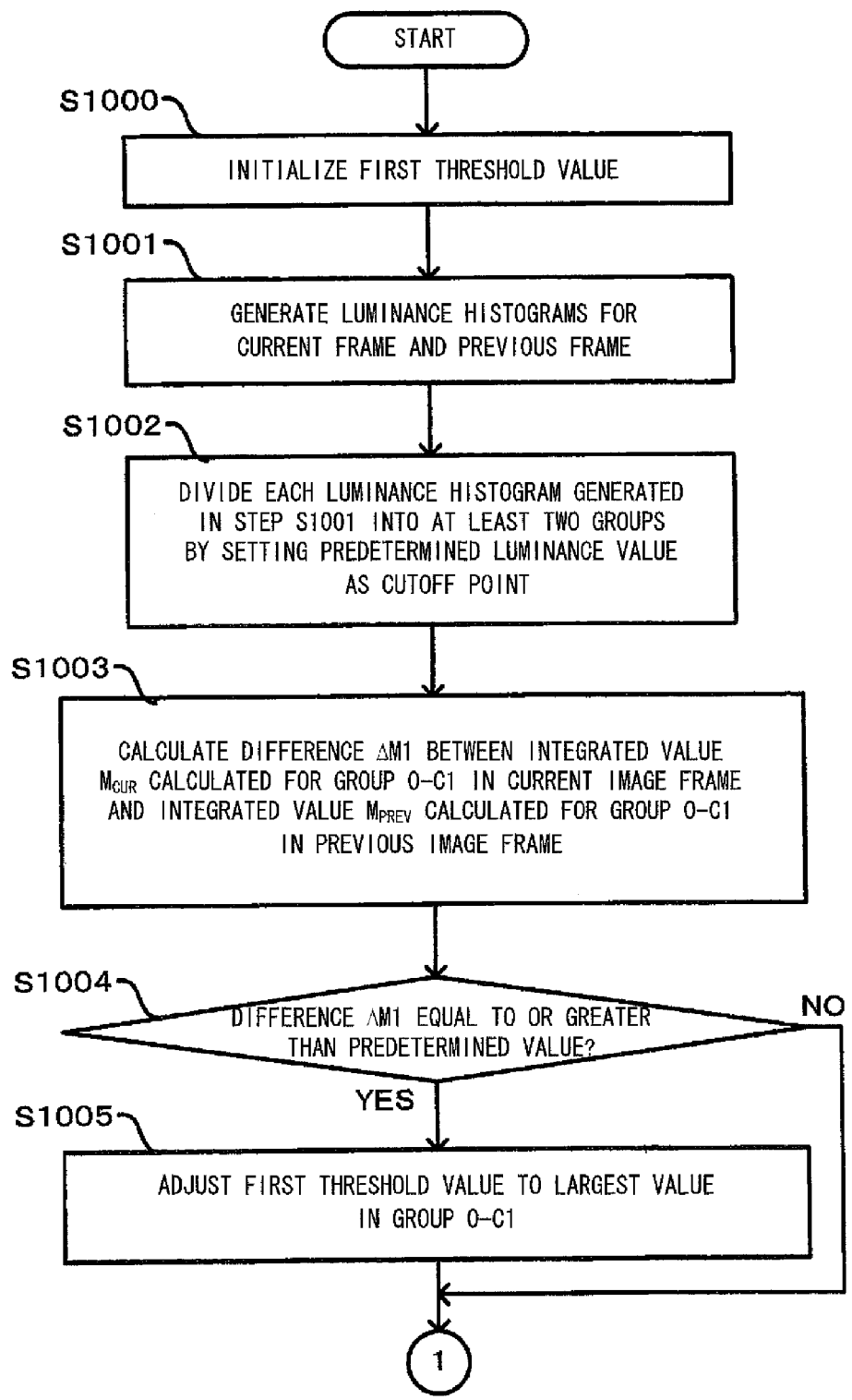
FIG. 19 presents a flowchart pertaining to the processing through which the first threshold value and the second threshold value used in the processing in FIG. 13 are set.
Figure 20:
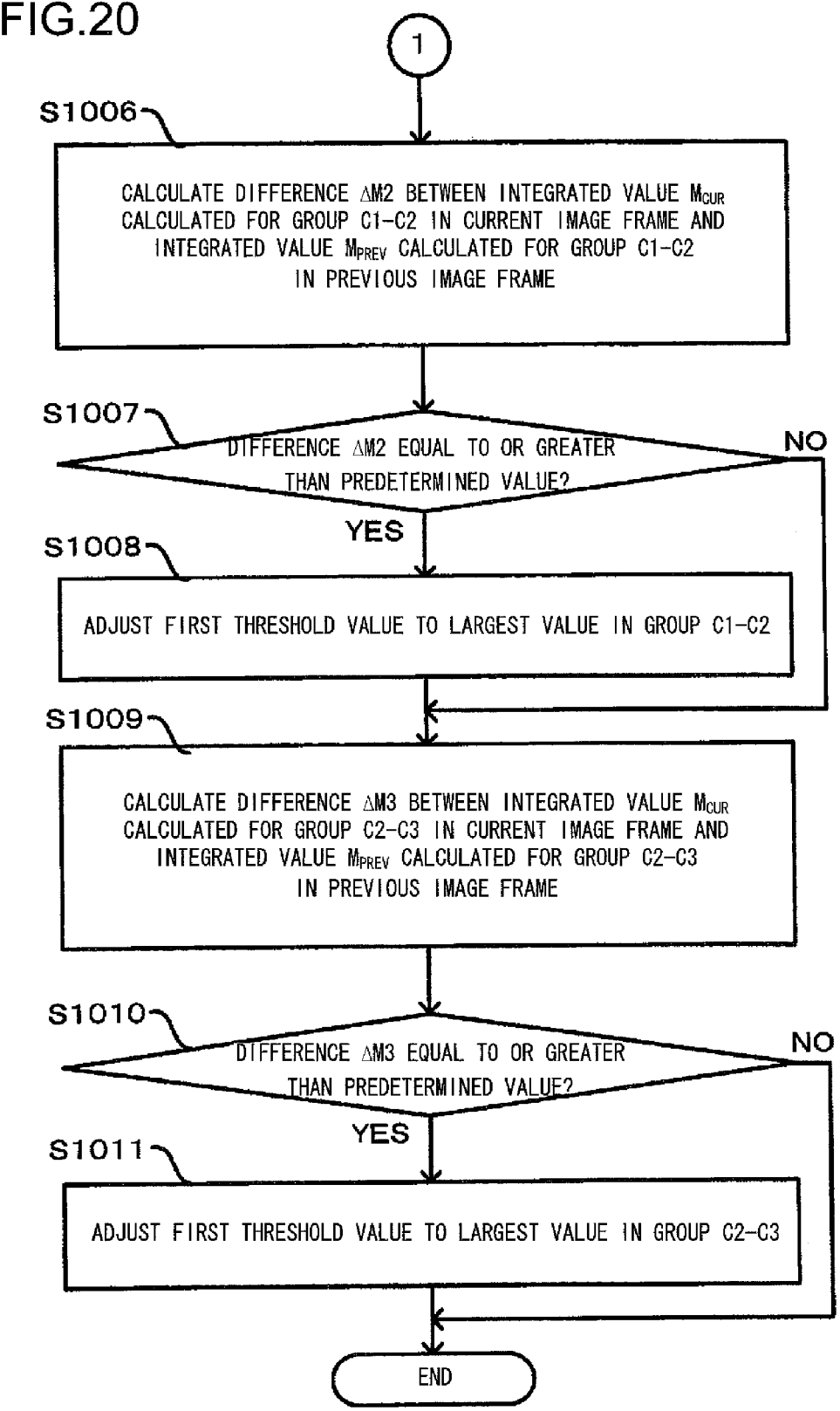
FIG. 20 presents a flowchart pertaining to the processing through which the first threshold value and the second threshold value used in the processing in FIG. 13 are set.

FIGS. 19 and 20 present a flowchart indicating how the first threshold value is set during a video shooting operation. Execution of the processing shown in FIG. 19 starts as the processing in step S800 in FIG. 18 starts during, for instance, a video shootings operation. It is to be noted that similar processing may be executed during a still image continuous shooting operation as well.

In step S1000 in FIG. 19, the control unit 3 initializes the first threshold value to a predetermined default value. Assuming that the luminance is expressed over, for instance, 256 gradations, the control unit 3 resets the first threshold value to 0.

In step S1001, the control unit 3 generates luminance histograms for the images in the current frame and the previous frame. In step S1002, the control unit 3 divides the luminance histogram having been generated for the current frame into at least two groups, a luminance range 0-C3 where underexposure black-out may be detected with a predetermined luminance value C3 set as the cutoff point and another luminance range C3-255.

FIG. 21(a) presents an example of a luminance histogram that may be generated for the current frame, i.e., the interpolation target image, whereas FIG. 21(b) presents an example of a luminance histogram that may be generated for the previous frame, i.e., the reference image. In FIG. 21, the luminance range 0-C3 is further divided into three groups, i.e., a group of luminance values equal to or greater than 0 and less than C1, a group of luminance values equal to or greater than C1 and less than C2 and a group luminance values equal to or greater than C2 and less than C3, by setting a cutoff point corresponding to a specific underexposure black-out decision-making value.

In step S1003, the control unit 3 calculates a difference ΔM1 between the integrated luminance value $M_{CUR}$ calculated for the group 0-C1 in the image in the current frame and the integrated luminance value $M_{PREV}$ calculated for the group 0-C1 in the image in the previous frame.

In step S1004, the control unit 3 makes a decision as to whether or not the difference ΔM1 is equal to or greater than a predetermined value. If an affirmative decision is made in step S1004, the control unit 3 allows the processing to proceed to step S1005, whereas if a negative decision is made in step S1004, the control unit 3 prompts the processing to proceed to step S1006 in FIG. 20.

In step S1005, the control unit 3 adjusts the first threshold value so as to take on the largest luminance value for the group 0-C1.

In step S1006 in FIG. 20, the control unit 3 calculates a difference ΔM2 between the integrated luminance value $M_{CUR}$ calculated for the group C1-C2 in the image in the current frame and the integrated luminance value $M_{PREV}$ calculated for the group C1-C2 in the image in the previous frame. In step S1007, the control unit 3 makes a decision as to whether or not the difference ΔM2 is equal to or greater than a predetermined value. If an affirmative decision is made in step S1007, the control unit 3 allows the processing to proceed to step S1008, whereas if a negative decision is made in step S1007, the control unit 3 prompts the processing to proceed to step S1009.

In step S1008, the control unit 3 adjusts the first threshold value so as to take on the largest luminance value for the group C1-C2.

In step S1009, the control unit 3 calculates a difference ΔM3 between the integrated luminance value $M_{CUR}$ calculated for the group C2-C3 in the image in the current frame and the integrated luminance value $M_{PREV}$ calculated for the group C2-C3 in the image in the previous frame. In step S1010, the control unit 3 makes a decision as to whether or not the difference ΔM3 is equal to or greater than a predetermined value. If an affirmative decision is made in step S1010, the control unit 3 allows the processing to proceed to step S1011, whereas if a negative decision is made in step S1010, the control unit 3 ends the processing in FIG. 20.

In step S1011, the control unit 3 adjusts the first threshold value so as to take on the largest luminance value for the group C2-C3.

The processing executed in these steps, as has been explained in reference to FIGS. 19 through 21, may also be adopted when setting the second threshold value and the third threshold value. When setting the second threshold value, for instance, the division into three groups; a group of luminance values equal to or greater than C4 and less than C5, a group of luminance values equal to or greater than C5 and less than C6 and a group of luminance values equal to or greater than C6 and less than C7, is performed by setting a cutoff point corresponding to a predetermined luminance value set on the high luminance side in FIGS. 21(a) and 21(b) to be used as an overexposure decision-making value. The flow of the processing executed in step S1003 and the following steps in FIG. 19 and in the steps shown in FIG. 20 to set the overexposure white-out threshold value is as follows. First, a decision is made as to whether or not the difference between the integrated value calculated for the group equal to or greater than C6 and less than C7 in the interpolation target image and the integrated value calculated for the group equal to or greater than C6 and less than C7 in the reference image is equal to or greater than a predetermined value, next, a decision is made as to whether or not the difference between the integrated value calculated for the group equal to or greater than C5 and less than C6 in the interpolation target image and the integrated value calculated for the group equal to or greater than C5 and less than C6 in the reference image is equal to or greater than a predetermined value, and then a decision is made as to whether or not the difference between the integrated value calculated for the group equal to or greater than C4 and less than C5 in the interpolation target image and the integrated value calculated for the group equal to or greater than C4 and less than C5 in the reference image is equal to or greater than a predetermined value. In addition, a description of the procedure for setting the third threshold value will be substantially identical to the description of the procedure for setting the second threshold value provided above, except that "luminance" in the description above should be replaced with "chromaticity".

When setting the threshold values as described above for an image, the luminance of which is expressed with 256 gradations, i.e., from 0 through 255 gradation levels, the ranges of these threshold values may be set by, for instance, first dividing the 256 gradations into four equal parts, setting a condition for the first threshold value so that it falls into a range from the luminance gradation 0 to the luminance gradation 63, setting the optimal exposure range to the luminance gradation 63 through the luminance gradation 192 and setting a condition for the second threshold value so that it falls into a range from the luminance gradation 192 to the luminance gradation 255.

The underexposure black-out detection range (the first threshold value setting range), the overexposure white-out detection range (the second threshold value setting range), the chromaticity saturation detection range (the third threshold value setting range) and the number of groups into which each range is divided may be set in advance or the user may be allowed to set them.

The following advantages are achieved through the embodiment described above.

The control unit 3 according to the present invention is able to function as the identifying unit 311, the image texture image generation unit 312 and the interpolation unit 313. The identifying unit 311 identifies an image area where gradations are lost, such as an underexposure black-out area, in the pre-interpolation image data $G_O$ obtained by capturing a subject image (see FIG. 13). The image texture image generation unit 312 aligns the reference image data $G_R$ obtained by capturing the same subject as that of the captured image with the pre-interpolation image data $G_O$ (step S401 in FIG. 15), and generates the image data $G_{IS}$ expressing a image texture image by extracting the image texture corresponding to the target image data $G_T$ having been identified by the identifying unit 311 (step S405 in FIG. 15). The interpolation unit 313 executes interpolation for the target image data $G_T$ in the captured image through semi-transparent blending of the image data $G_{IS}$ expressing the image texture image having been generated by the image texture image generation unit 312 and the pre-interpolation image data $G_O$. In other words, instead of synthetically generating a composite image by using a plurality of sets of image data in their entirety, the image texture of the target image data $G_T$ having undergone the alignment processing is interpolated through semitransparent blending for the pre-interpolation image data $G_O$. As a result, optimal interpolation is achieved for any image area where changes in the gradations are substantially missing due to, for instance, underexposure black-out, overexposure white-out or color saturation.

The embodiments described above allow for the following variations.

The present invention may be adopted in an image processing device other than the digital camera 1 or the digital camera 2. For instance, it may be adopted in a personal computer, a portable telephone or the like, to which a recording medium such as a hard disk or a flash memory with the control program 131 installed therein is connected.

Figure 22:
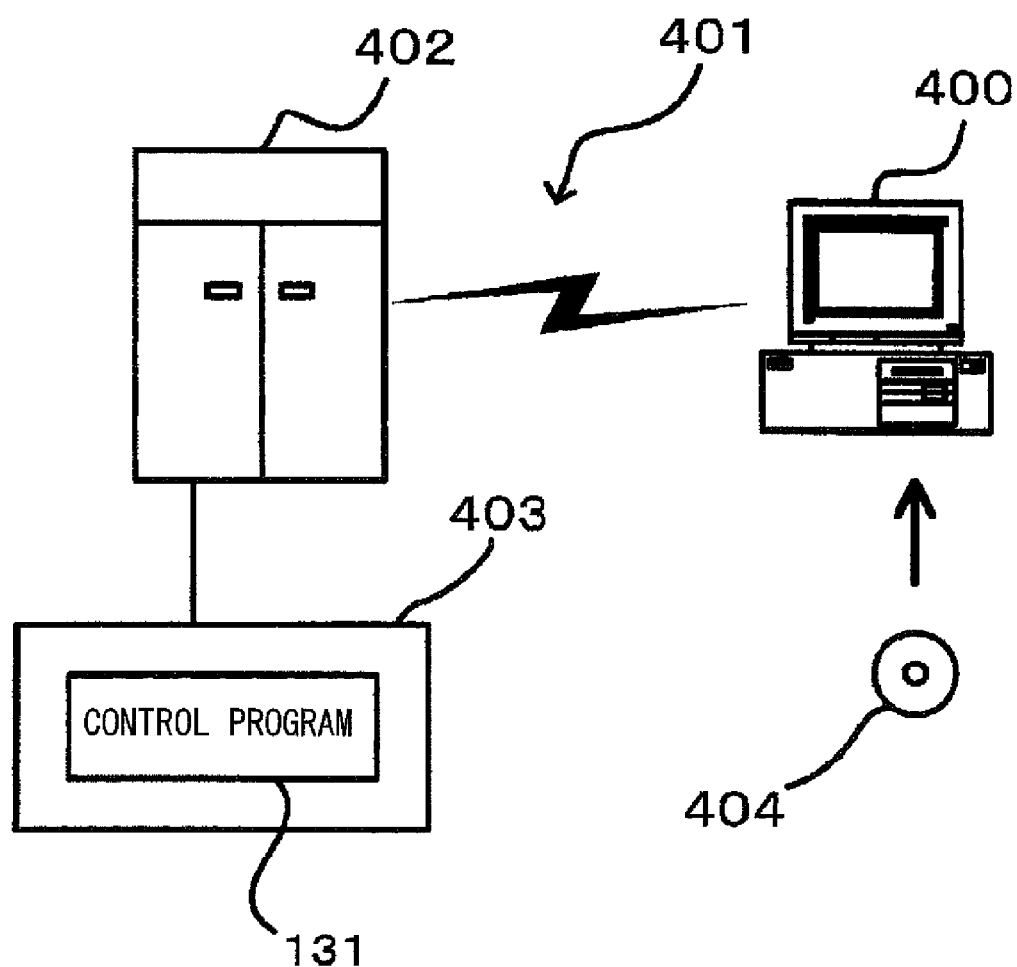
FIG. 22 shows how a control program may be provided.

In addition, when the present invention is adopted in, for instance, a personal computer, the control program 131 described earlier may be provided in a recording medium such as a CD-ROM or via a data signal transmitted through the Internet or the like. FIG. 22 shows how the program may be provided. A personal computer 400 takes in the program via a CD-ROM 404. The personal computer 400 is also capable of connecting with a communication line 401. A computer 402 is a server computer that provides the control program 131 stored in a recording medium such as a hard disk 403. The communication line 401 may be a communication line for Internet communication, personal computer communication or the like, or it may be a dedicated communication line. The computer 402 reads out the control program 131 from the hard disk 403 and transmits the control program 131 to the personal computer 400 via the communication line 401. In other words, the control program 131, embodied as a data signal carried on a carrier wave, is transmitted via the communication line 401. The control program 131 can thus be distributed as a computer-readable computer program product achieved in any of various modes including a recording medium and a data signal (carrier wave).

As long as the features characterizing the present invention are not compromised, the present invention is in no way limited to the particulars of the embodiments and variations described above. In addition, as long as the features characterizing the present invention remain intact, the embodiments and variations thereof described above may be adopted in any conceivable combination.

The disclosure of the following priority application is herein incorporated by reference: Japanese Patent Application No. 2011-191268 filed Sep. 2, 2011.

The invention claimed is:

1. An image processing device, comprising:
   an identifying unit, implemented by a processor, that identifies a first image area including a first plurality of pixels or a second image area including a second plurality of pixels, in a first captured image obtained by capturing a subject image, a first luminance value of each of the first plurality of pixels being equal to or less than a first threshold value and a second luminance value of each of the second plurality of pixels each being equal to or greater than a second threshold value;
   an image texture image generation unit, implemented by the processor, that generates an image texture image by aligning a second captured image, obtained by capturing an image of a subject matching the subject of the first captured image, with the first captured image and extracting an image texture corresponding to the image area having been identified by the identifying unit;
   an interpolation unit, implemented by the processor, that executes interpolation for the image area in the first captured image by synthetically incorporating the image texture image having been generated by the image texture image generation unit with the first captured image; and
   a threshold value setting unit, implemented by the processor, that alters at least one of the first threshold value and second threshold value based upon luminance information of the first captured image.

2. An image processing device according to claim 1, wherein:
   the threshold value setting unit;
   generates a luminance histogram of the first captured image and divides the luminance histogram into a plurality of groups;
   calculates a first difference between an integrated value calculated for a current frame in correspondence to a first group, which includes a lowest grade assuming a frequency value other than 0, among the plurality of groups and an integrated value calculated for a previous frame in correspondence to the group;
   calculates a second difference between an integrated value calculated for the current frame in correspondence to a second group, which includes a highest grade assuming a frequency value other than 0, among the plurality of groups and an integrated value calculated for the previous frame in correspondence to the group;
   sets a largest value in the first group for the first threshold value if the first difference is equal to or greater than a predetermined value; and sets a smallest value in the second group for the second threshold value if the second difference is equal to or greater than a predetermined value.

3. An image processing device according claim 1, wherein:

the image texture includes at least image edges.

4. An image processing device according to claim 3, wherein:

the image texture further includes image luminance gradation information.

5. An image processing device according to claim 1, further comprising:

an image capturing unit that captures the first captured image and the second captured image.

6. A non-transitory computer-readable computer program product containing a control program for image processing, the control program comprising:

an instruction for identifying a first image area including a first plurality of pixels or a second image area including a second plurality of pixels, in a first captured image obtained by capturing a subject image, a first luminance value of each of the first plurality of pixels being equal to or less than a first threshold value and a second luminance value of each of the second plurality of pixels being equal to or great than a second threshold value;

an instruction for generating an image texture image by aligning a second captured image obtained by capturing an image of a subject matching the subject of the first captured image with the first captured image, and by extracting an image texture corresponding to the image area having been identified;

an instruction for executing interpolation for the image area in the first captured image by synthetically incorporating the image texture image having been generated and the first captured image; and an instruction for altering at least one of the first threshold value and the second threshold value based upon luminance information of the first captured image.

7. An image processing device, comprising:

an image frame extracting unit, implemented by the processor, that extracts a target image frame subject to exposure correction, among image frames constituting a video image recorded in a recording medium;

an identifying unit, implemented by the processor, that identifies a first image area including a first plurality of pixels or a second image area including a second plurality of pixels, in the target image frame, a first luminance value of each of the first plurality of pixels being equal to or less than a first threshold value and a second luminance value of each of the second plurality of pixels being equal to or greater than a second threshold value;

an estimating unit, implemented by the processor, that estimates a texture of the first image area of the second image area by using an image frame, other than the target image frame, constituting the video image;

an interpolation unit, implemented by the processor, that executes interpolation for the first image area or the second image area in the image frame based upon estimation results provided by the estimating unit; and a threshold value setting unit, implemented by the processor, that alters at least one of the first threshold value and the second threshold value based upon luminance information of the target image frame.

8. An image processing device according to claim 7, wherein:

the identifying unit identifies the first image area or the second image area based upon luminance distribution within the image frame.

9. An image processing device according to claim 7, wherein:

the estimating unit generates a texture image for the first image area or the second image area by using an image frame other than the target image frame; and the interpolation unit executes interpolation by incorporating the texture image in the first image area the second image area.

10. An image processing device according to claim 7, further comprising:

an image sensor that captures an image formed with subject light, wherein:

a video image generated based upon image capturing signals provided from the image sensor is recorded in the recording medium.

* * * * *